US011153590B2

(12) United States Patent
Xu et al.

(10) Patent No.: US 11,153,590 B2
(45) Date of Patent: Oct. 19, 2021

(54) METHOD AND APPARATUS FOR VIDEO CODING

(71) Applicant: Tencent America LLC, Palo Alto, CA (US)

(72) Inventors: Meng Xu, San Jose, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/735,383

(22) Filed: Jan. 6, 2020

(65) Prior Publication Data

US 2020/0228815 A1    Jul. 16, 2020

Related U.S. Application Data

(60) Provisional application No. 62/791,700, filed on Jan. 11, 2019.

(51) Int. Cl.
| | |
|---|---|
| *H04N 19/44* | (2014.01) |
| *H04N 19/159* | (2014.01) |
| *H04N 19/176* | (2014.01) |
| *H04N 19/105* | (2014.01) |
| *H04N 19/513* | (2014.01) |

(52) U.S. Cl.
CPC .......... *H04N 19/44* (2014.11); *H04N 19/105* (2014.11); *H04N 19/159* (2014.11); *H04N 19/176* (2014.11); *H04N 19/513* (2014.11)

(58) Field of Classification Search
None
See application file for complete search history.

(56) References Cited

U.S. PATENT DOCUMENTS

| | | | |
|---|---|---|---|
| 2008/0117971 A1 | 5/2008 | Ramachandran et al. | |
| 2018/0241998 A1* | 8/2018 | Chen | H04N 19/51 |
| 2018/0278950 A1* | 9/2018 | Chen | H04N 19/44 |
| 2018/0359483 A1 | 12/2018 | Chen et al. | |
| 2019/0246143 A1* | 8/2019 | Zhang | H04N 19/174 |
| 2020/0221122 A1* | 7/2020 | Ye | H04N 19/103 |

FOREIGN PATENT DOCUMENTS

| | | |
|---|---|---|
| WO | WO2018/097700 A1 | 5/2018 |
| WO | WO2018/113658 A1 | 6/2018 |

OTHER PUBLICATIONS

PCT International Search Report and Written Opinion Issued in Application PCT/US2020/013035 dated Mar. 31, 2020, (17 pages).

* cited by examiner

*Primary Examiner* — Kate H Luo
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. The processing circuitry decodes prediction information of a current block in a current picture from a coded video bitstream. The prediction information is indicative of an inter prediction mode. Then, the processing circuitry determines a usage of a first DMVD process on the current block at least partially based on a second DMVD process not being used on the current block. Further, the processing circuitry reconstructs the current block according to the inter prediction mode with the first DMVD process.

20 Claims, 23 Drawing Sheets

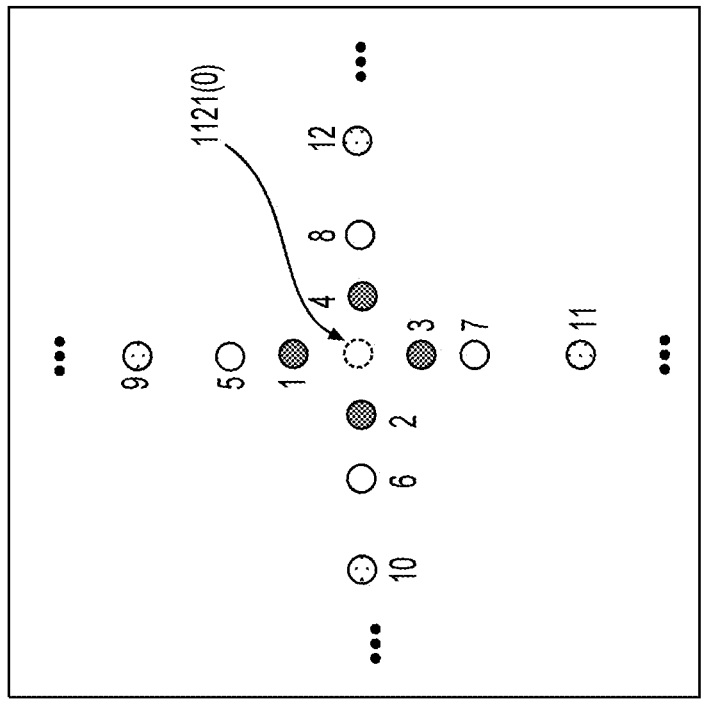
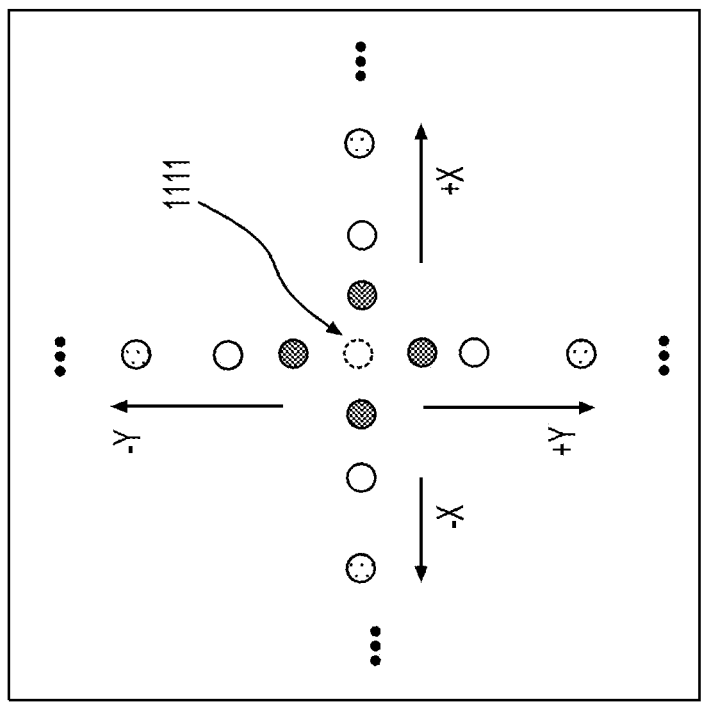
FIG. 11

METHOD AND APPARATUS FOR VIDEO CODING

INCORPORATION BY REFERENCE

This present application claims the benefit of priority to U.S. Provisional Application No. 62/791,700, "LOW LATENCY DECODER-SIDE MOTION DERIVATION" filed on Jan. 11, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. The processing circuitry decodes prediction information of a current block in a current picture from a coded video bitstream. The prediction information is indicative of an inter prediction mode. Then, the processing circuitry determines a usage of a first DMVD process on the current block at least partially based on a second DMVD process not being used on the current block. Further, the processing circuitry reconstructs the current block according to the inter prediction mode with the first DMVD process.

In some embodiments, the first DMVD process is decoder side motion vector refinement (DMVR), and the second DMVD process is bi-directional optical flow (BDOF). In some other embodiments, the first DMVD process is bi-directional optical flow (BDOF), and the second DMVD process is decoder side motion vector refinement (DMVR).

In an embodiment, the processing circuitry determines the usage of the first DMVD process on the current block when the second DMVD process is disabled for the current block.

In another embodiment, the processing circuitry determines, when the second DMVD process is enabled, whether the second DMVD process is activated, and disables the first DMVD process when the second DMVD process is activated.

In another embodiment, the processing circuitry determines the usage of the first DMVD process when an early skip condition is true for the second DMVD process.

In some examples, the DMVR is regarded as disabled when the inter prediction mode is one of a triangle merge mode, an affine mode, a generalized bi-prediction (GBi) mode, a weighted prediction mode.

In an example, the processing circuitry checks enable/disable status of DMVR on sub-blocks of the current block and enables/disables DMVR for the current block based on the status of DMVR on the sub-blocks.

In another example, the processing circuitry enables BDOF on a first subset of sub-blocks of the current block and disables BDOF on a second subset of sub-blocks of the current block. Further, the processing circuitry pads a first sub-block that is disabled for BDOF during a BDOF gradient calculation from a second sub-block that is enabled for BDOF.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 11 shows examples for merge mode with motion vector difference (MMVD) according to an embodiment of the disclosure.

DETAILED DESCRIPTION OF EMBODIMENTS

Figure 2:
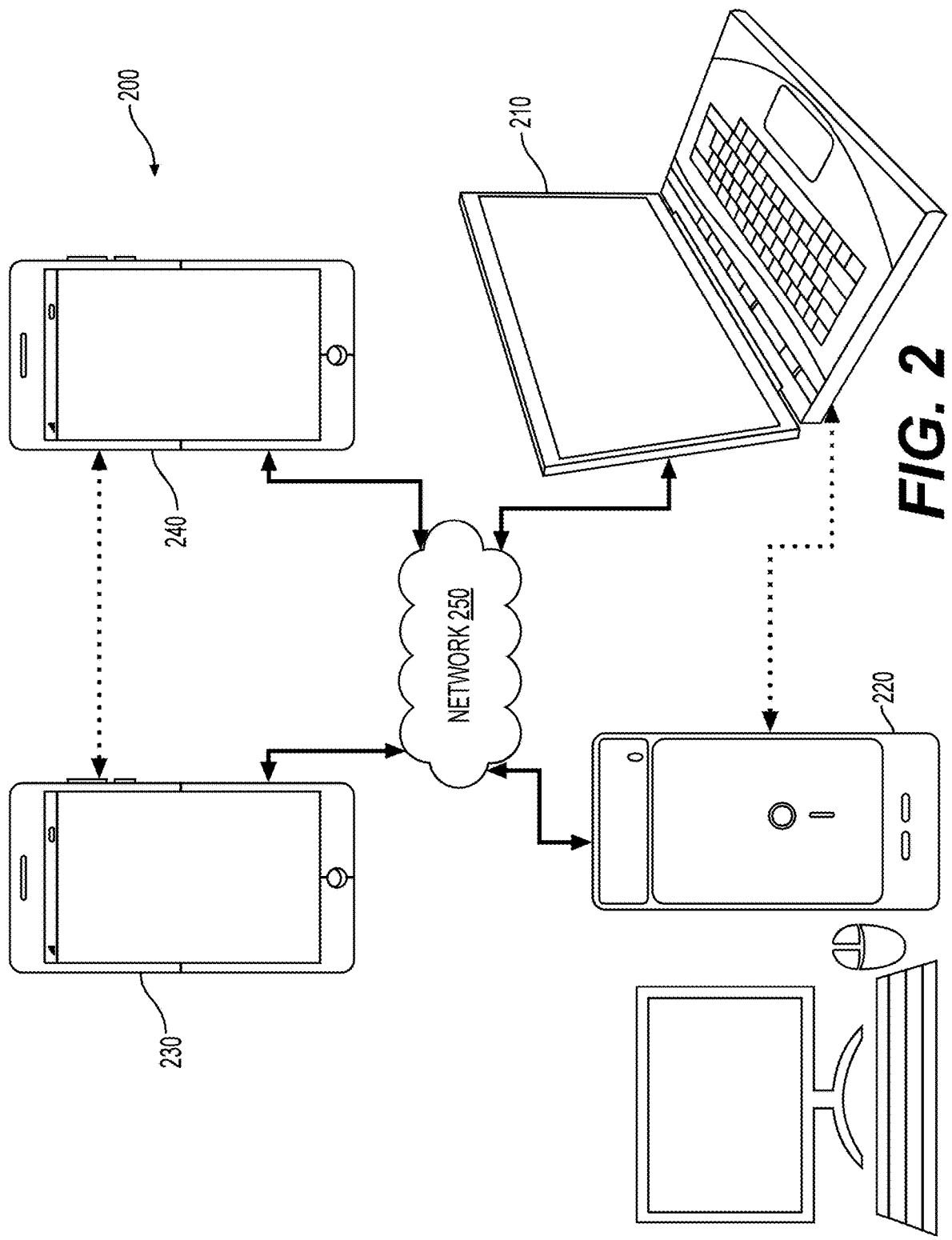
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
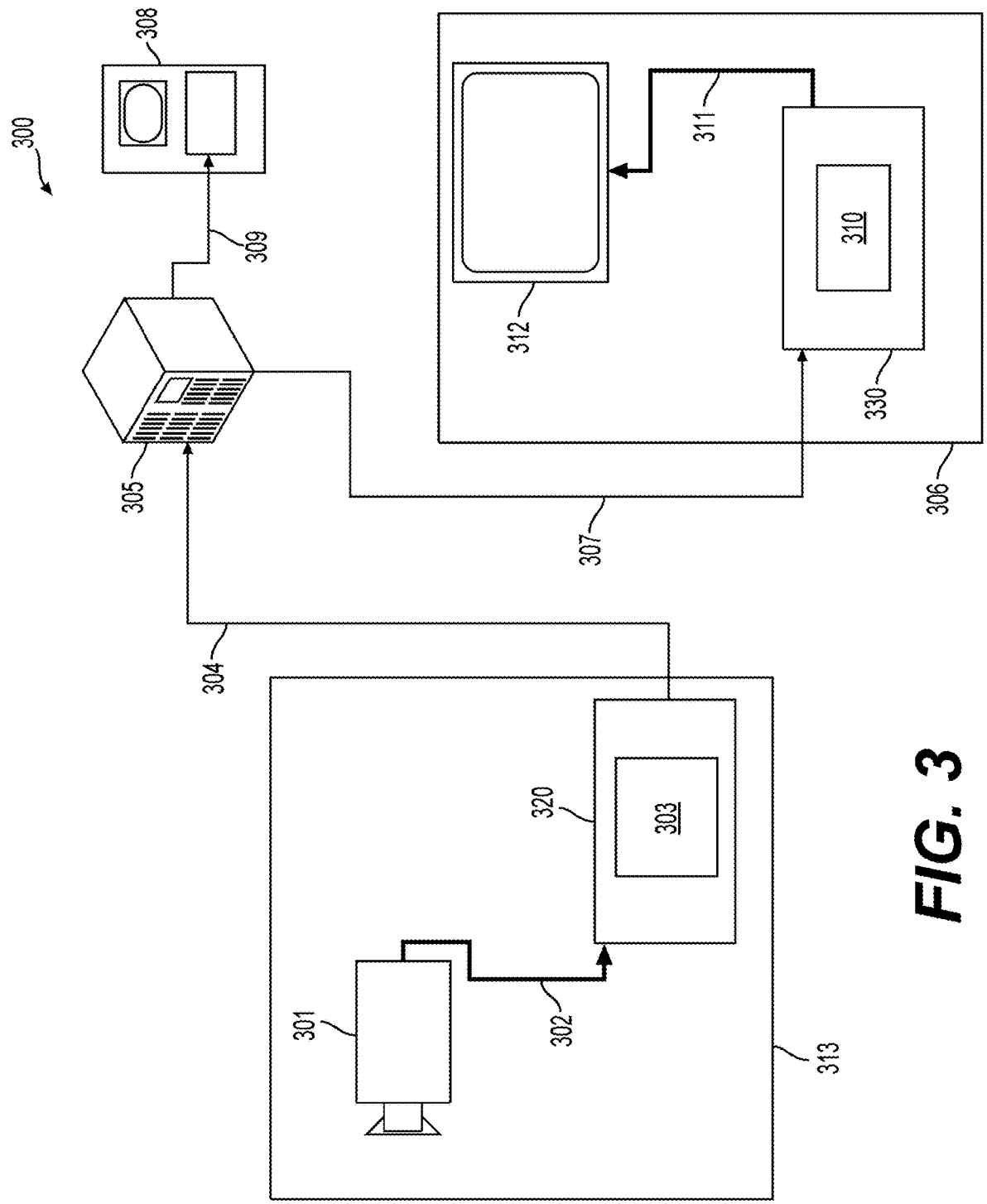
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
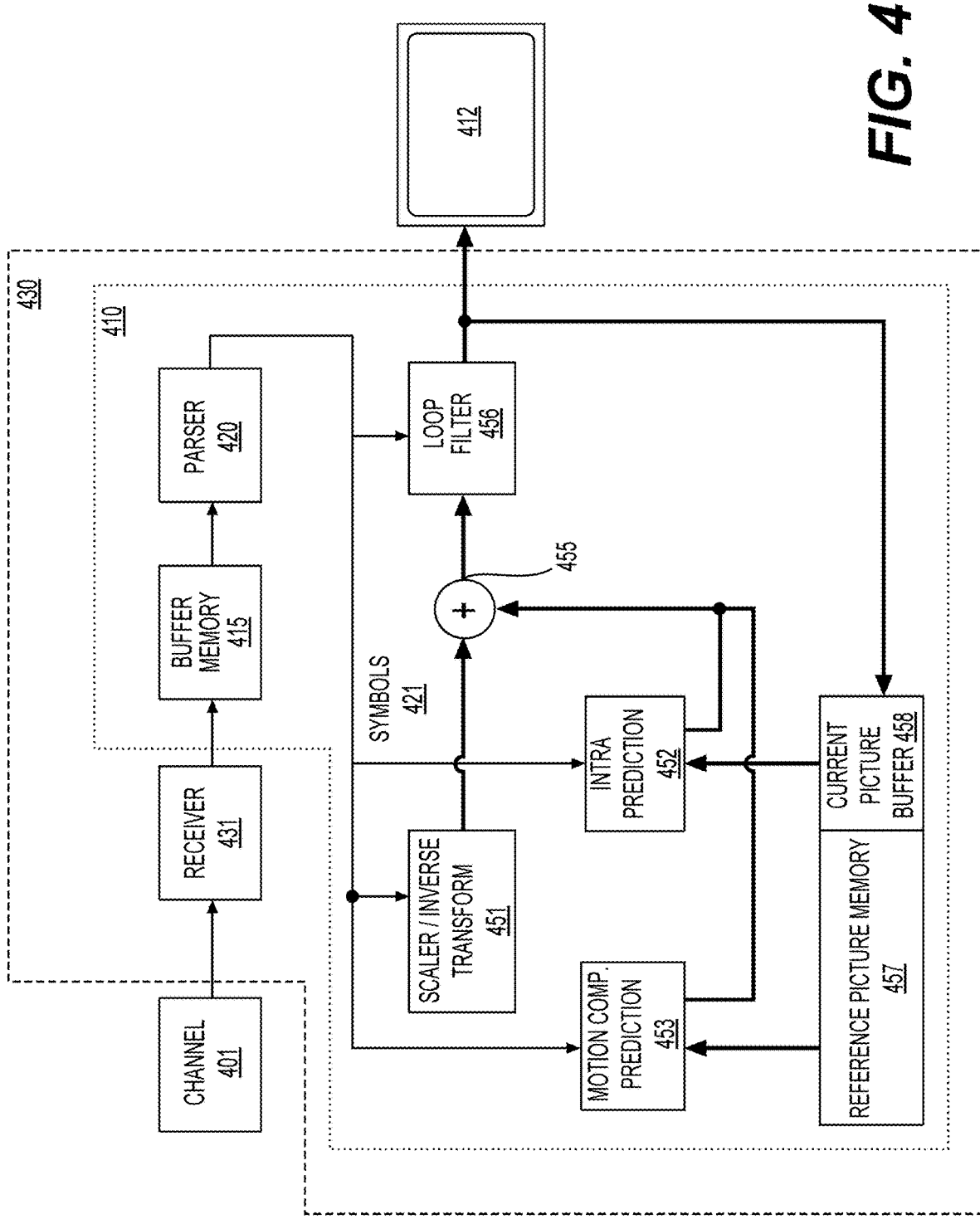
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
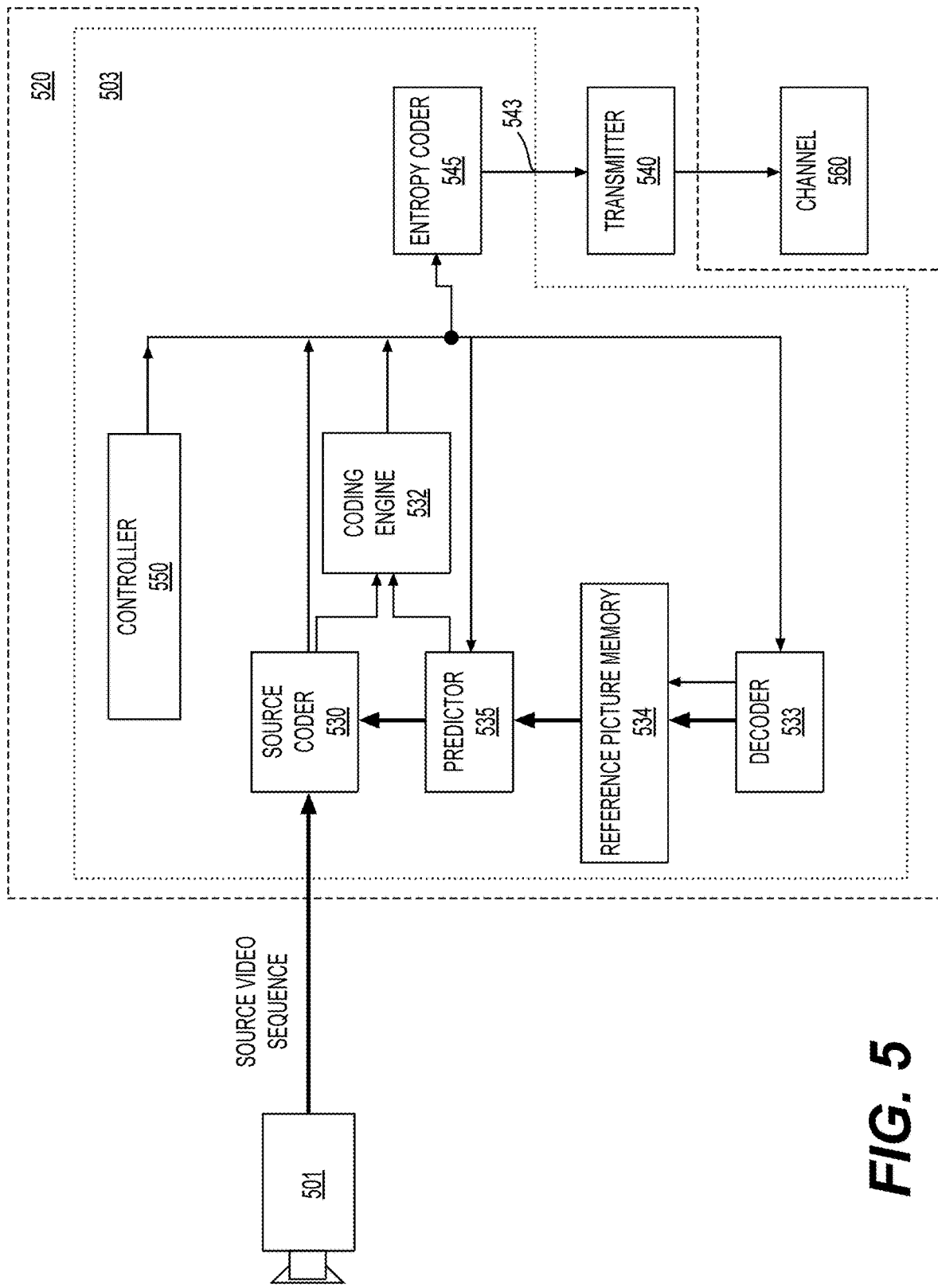
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
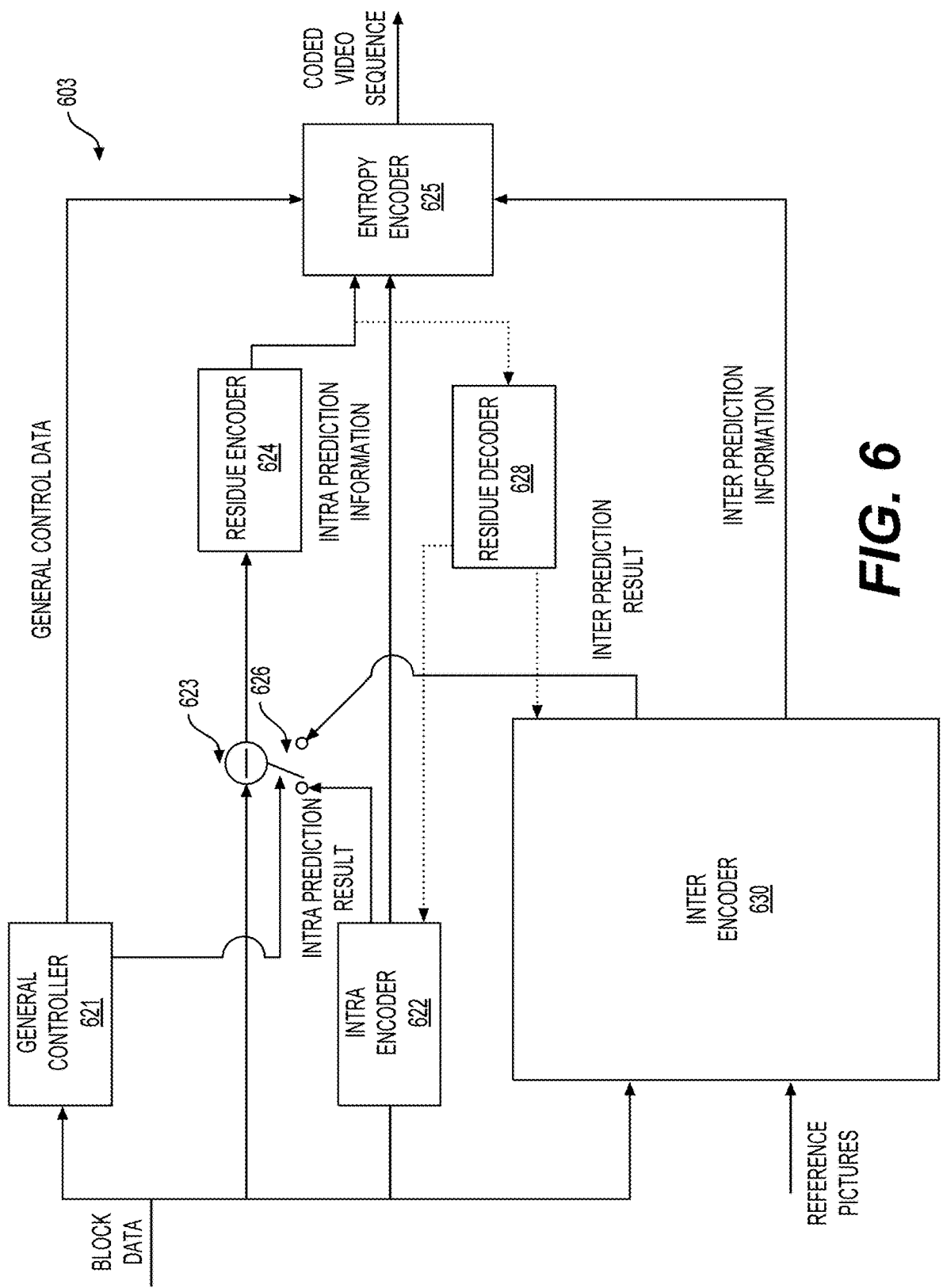
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603)

includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
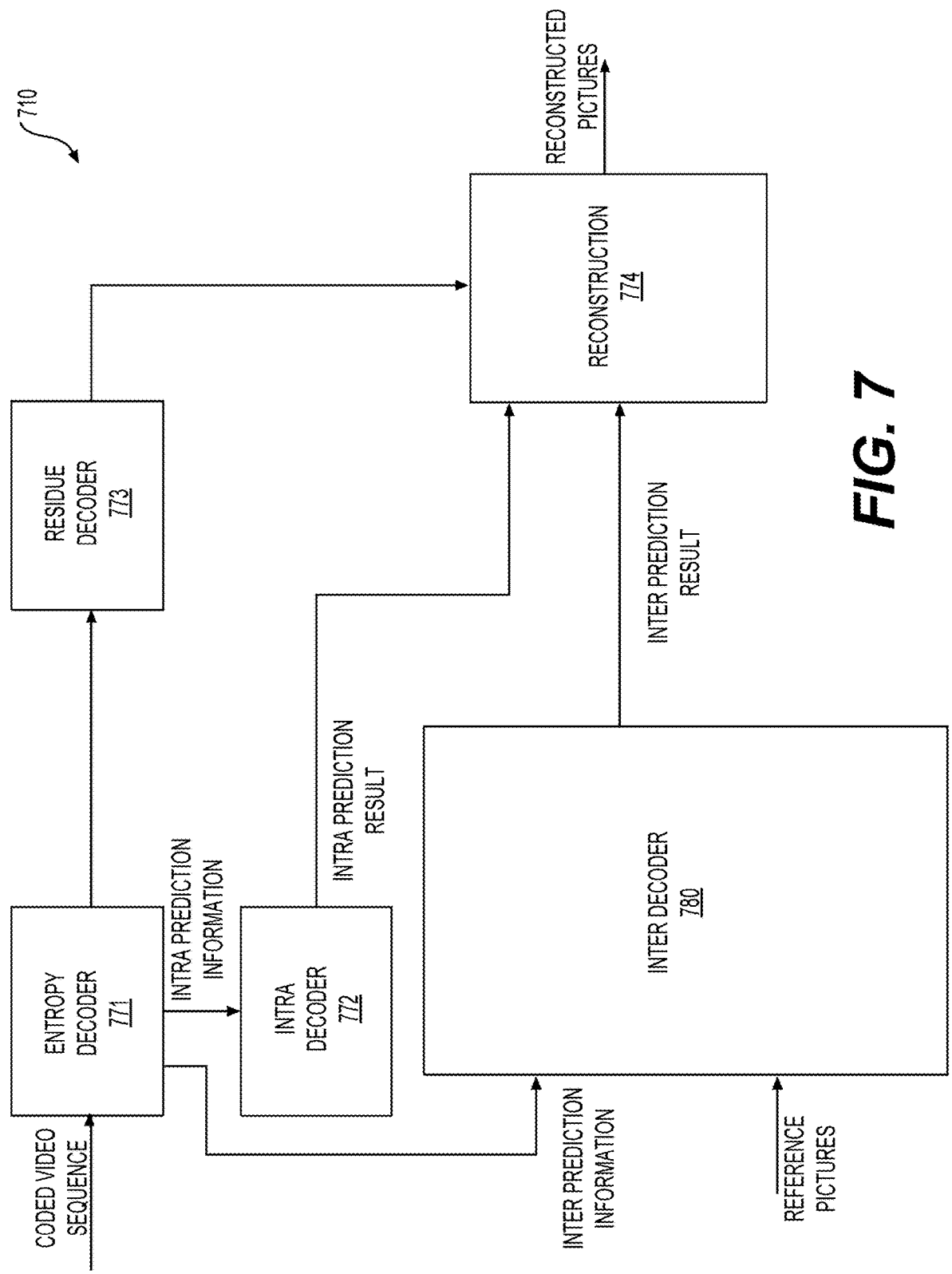
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for low latency decoder-side motion derivation. Inter prediction in advanced video codec, specifically the decoder side motion vector derivation processes, can be modified according to the techniques to reduce the decoding latency.

Various coding standards, such as HEVC, VVC and the like are developed to include new techniques for better video coding performance.

In some examples of VVC, for each inter-predicted CU, motion parameters include motion vectors, reference picture indices and reference picture list usage index, and additional information needed for the new coding feature of VVC to be used for inter-predicted sample generation. The motion parameters can be signaled in an explicit or implicit manner. In an example, when a CU is coded with skip mode, the CU is associated with one PU and has no significant residual coefficients, no coded motion vector delta (e.g., motion vector difference) or reference picture index. In another example, a merge mode is specified whereby the motion parameters for the current CU are obtained from neighboring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Beyond the inter coding features in HEVC, the VVC test model 3 (VTM3) includes a number of new and refined inter prediction coding tools, such as extended merge prediction, merge mode with motion vector difference (MMVD), affine motion compensated prediction, bi-directional optical flow (BDOF), triangle partition prediction, combined inter and intra prediction (CIIP), and the like. Some features of the above mentioned inter prediction coding tools are described in the present disclosure.

In some examples, extended merge prediction is used in VTM3. Specifically, in VTM3, the merge candidate list is constructed by including the five types of candidates in an order of: (1) spatial motion vector predictor (MVP) from spatial neighbor CUs; (2) temporal MVP from collocated CUs; (3) history-based MVP from a FIFO table; (4) pairwise average MVP; and (5) zero MVs. In some embodiments, the techniques used in merge candidate list construction include spatial candidate derivation, temporal candidate derivation, history-based merge candidate derivation and pair-wise average merge candidate derivation.

In an example, the size of merge list is signaled in slice header and the maximum allowed size of a merge list is 6 in VTM3. For each CU coded in merge mode, an index of the best merge candidate is encoded using truncated unary binarization (TU). The first binary of the merge index is coded with context coding, and bypass coding can be used for other binaries.

Figure 1:
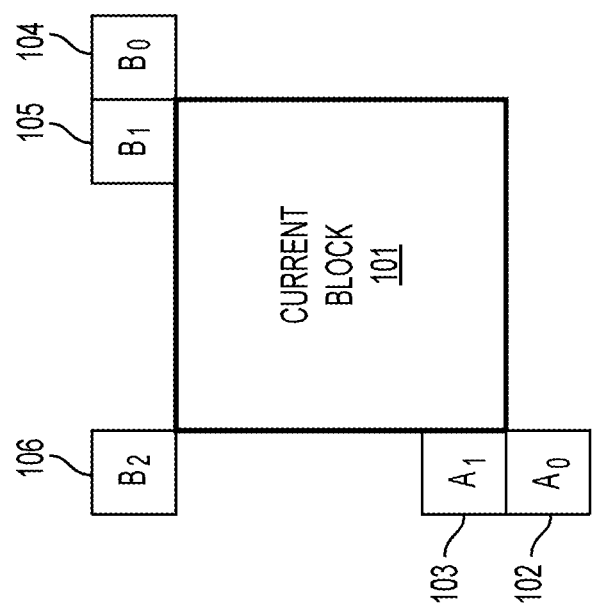
FIG. 1 is a schematic illustration of a current block and its surrounding spatial merge candidates in one example.

For spatial candidate derivation, according to an aspect of the disclosure, the derivation of spatial merge candidates in VVC is similar to that in HEVC. For example, a maximum of four merge candidates are selected among candidates located in the positions A0-A1 and B0-B2 depicted in FIG. 1. The order of derivation is A1, B1, B0, A0 and B2. Position B2 is considered only when any CU of position A1, B1, B0, A0 is not available (e.g. belonging to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check.

Figure 8:
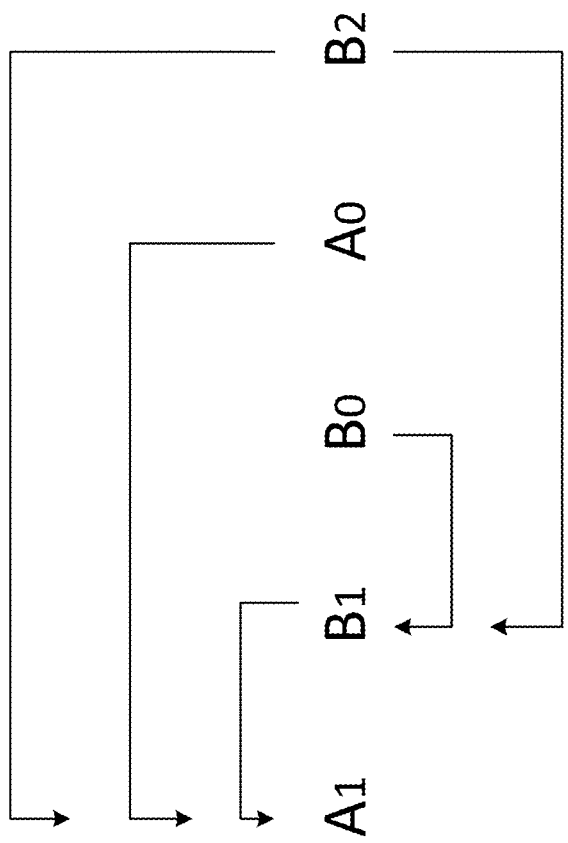
FIG. 8 shows a diagram illustrating redundancy check pairs for some embodiments.

FIG. 8 shows a diagram illustrating redundancy check pairs for some embodiments. In an embodiment, only pairs linked with an arrow in FIG. 8 are considered in redundancy check and a candidate is only added to the list if the corresponding candidate used for redundancy check has not the same motion information.

For temporal candidate derivation, according to an aspect of the disclosure, only one candidate is added to the list. Particularly, in the derivation of the temporal merge candidate, a scaled motion vector is derived based on a co-located CU belonging to the collocated reference picture. The reference picture list to be used for derivation of the co-located CU is explicitly signaled in the slice header.

Figure 9:
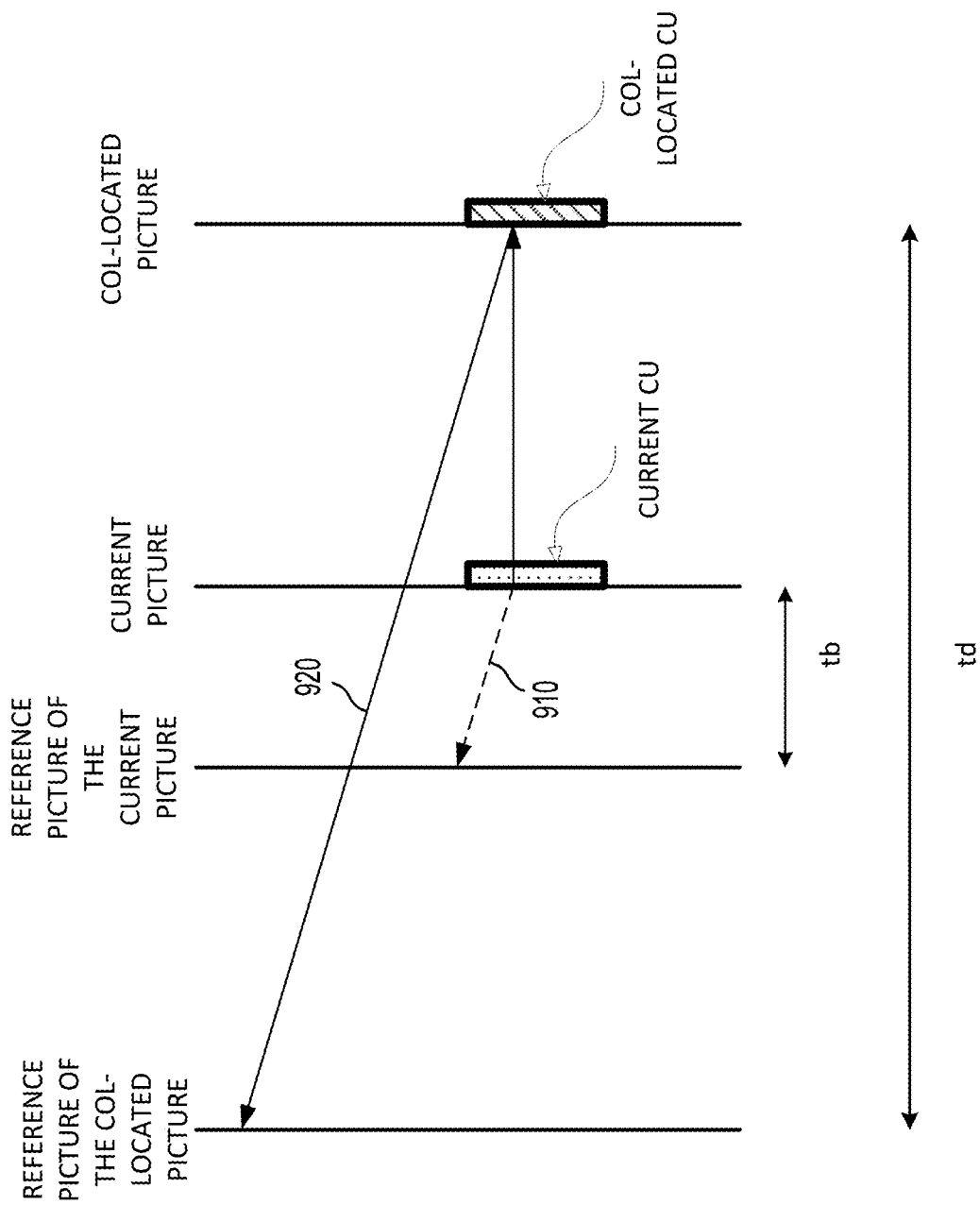
FIG. 9 shows an example for temporal candidate derivation.

FIG. 9 shows an example for temporal candidate derivation. FIG. 9 shows a sequence of pictures that includes a current picture having a current CU, a collocated picture having a col-located CU of the current CU, a reference picture of the current picture and a reference picture of the col-located picture. In an example, a picture order count (POC) distance (e.g., difference of POCs) between the reference picture of the current picture and the current picture is denoted as tb, and the POC distance between the reference picture of the col-located picture and the col-located picture is denoted as td. The scaled motion vector for temporal merge candidate is shown by 910 in FIG. 9, which is scaled from the motion vector 920 of the co-located CU using the POC distances, tb and td (e.g., ratio of tb over td). The reference picture index of temporal merge candidate is set equal to zero in an example.

Figure 10:
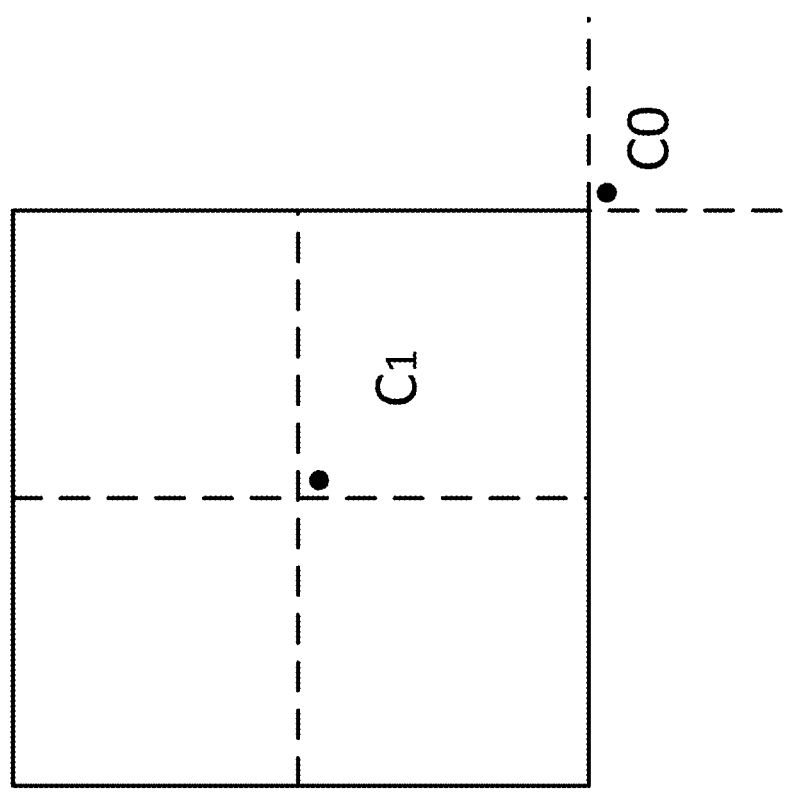
FIG. 10 shows an example for illustrating the position for the temporal candidate.

FIG. 10 shows an example for illustrating the position for the temporal candidate that is selected between candidates $C_0$ and $C_1$. When the CU at position $C_0$ is not available, or is intra coded, or is outside of the current row of CTUs, then the position $C_1$ can be used. Otherwise, the position $C_0$ is used in the derivation of the temporal merge candidate.

The history-based MVP (HMVP) merge candidates are added to merge list after the spatial MVP and temporal MVP (TMVP). In some examples, for history-based merge candidate derivation, the motion information of a previously coded block is stored in a table and used as MVP for the current CU. The table with multiple HMVP candidates is maintained during the encoding/decoding process. The table is reset (emptied) when a decoding of a new CTU row starts. Whenever there is a non-subblock inter-coded CU, the associated motion information is added to the last entry of the table as a new HMVP candidate.

In some examples, such as in VTM3, the HMVP table size S is set to be 6, which indicates up to 6 history-based MVP (HMVP) candidates may be added to the table. At a time of inserting a new motion candidate to the table, a constrained first-in-first-out (FIFO) rule is utilized wherein redundancy check is firstly applied to find whether there is an identical HMVP in the table. If an identical HMVP in the table is found, the identical HMVP is removed from the table and all the HMVP candidates afterwards can move forward.

HMVP candidates can be used in the merge candidate list construction process. The latest several HMVP candidates in the table are checked in order and inserted to the candidate list after the TMVP candidate. Redundancy check is applied on the HMVP candidates to the spatial or temporal merge candidate.

In some examples, to reduce the number of redundancy check operations, some simplifications are introduced. In an example, the number of HMPV candidates is used for merge list generation is set as (N<=4)?M:(8-N), where N denotes the number of existing candidates in the merge list and M denotes the number of available HMVP candidates in the table.

In another example, once the total number of available merge candidates is 1 below the maximum value for the allowed merge candidates, the merge candidate list construction process from HMVP is terminated.

For the pair-wise average merge candidate derivation, pair-wise average candidates are generated by averaging predefined pairs of candidates in the existing merge candidate list. In some examples, the predefined pairs are defined as {(0, 1), (0, 2), (1, 2), (0, 3), (1, 3), (2, 3)}, where the numbers denote the merge indices in the merge candidate list. The averaged motion vectors are calculated separately for each reference list. When both motion vectors are available in one reference list, these two motion vectors are averaged even when they point to different reference pictures. When only one motion vector is available in reference list, use the one motion vector directly; if no motion vector is available in the reference list, the reference list is invalid.

In some examples, when the merge list is not full after pair-wise average merge candidates are added, the zero MVPs are inserted in the end until the maximum merge candidate number is encountered.

In addition to merge mode, where the implicitly derived motion information is directly used for prediction samples generation of the current CU, the merge mode with motion vector differences (MMVD) is introduced in VVC. In some examples, a MMVD flag is signaled right after sending a skip flag and a merge flag to specify whether MMVD mode is used for a CU.

In MMVD, after a merge candidate is selected, the motion information is further refined by the signaled motion vector difference (MVD) information. In some examples, the information includes a merge candidate flag, an index to specify motion magnitude, and an index for indication of motion direction. In MMVD mode, one of the first two candidates in the merge list is selected to be used as MV basis. The merge candidate flag is signaled to specify which one is used.

In some examples, a distance index is used to specify motion magnitude information and indicate the pre-defined offset from a starting point.

FIG. 11 shows examples for MMVD according to an embodiment of the disclosure. For example, the starting point MV to L0 reference is shown by (1111) (for example according to a prediction direction IDX and base candidate IDX). Similarly, the starting point MV to L1 reference is shown as (1121). The offset is added to either horizontal component or vertical component of starting MV. An example of the relation of distance index and pre-defined offset is shown in Table 1.

TABLE 1

Relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

In some examples, direction index represents the direction of the MVD relative to the starting point. The direction index can represent of the four directions as shown in Table 2. It's noted that the meaning of MVD sign could be variant according to the information of starting MVs. When the starting MVs is an uni-prediction MV or bi-prediction MVs with both lists point to the same side of the current picture (i.e. POCs of two reference pictures are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference picture is larger than the POC of the current picture, and the POC of the other reference picture is smaller than the POC of the current picture), the sign in Table 2 specifies the sign of MV offset added to the list0 MV component of starting MV and the sign for the list1 MV has opposite value.

TABLE 2

Sign of MV offset specified by direction index

| | Direction IDX | | | |
|---|---|---|---|---|
| | 00 | 01 | 10 | 11 |
| x-axis | + | − | N/A | N/A |
| y-axis | N/A | N/A | + | − |

For affine motion compensated prediction, in HEVC, only translation motion model is applied for motion compensation prediction (MCP). The real world has many kinds of motion, e.g. zoom in/out, rotation, perspective motions and the other irregular motions. In the VTM3, a block-based affine transform motion compensation prediction is applied.

Figure 12B:
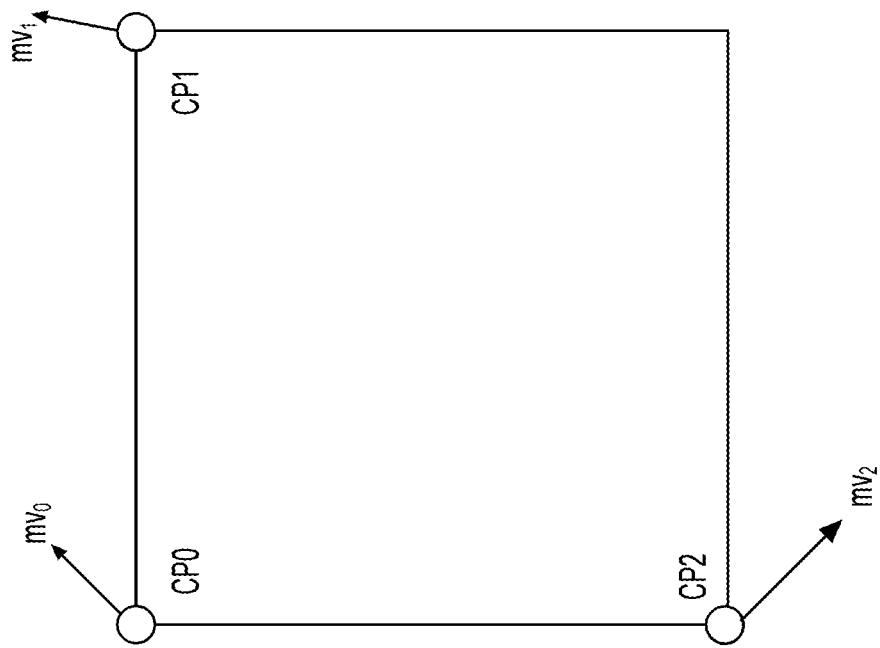
FIGS. 12A-12B show the affine motion field of a block described by motion information of control points.
Figure 12A:
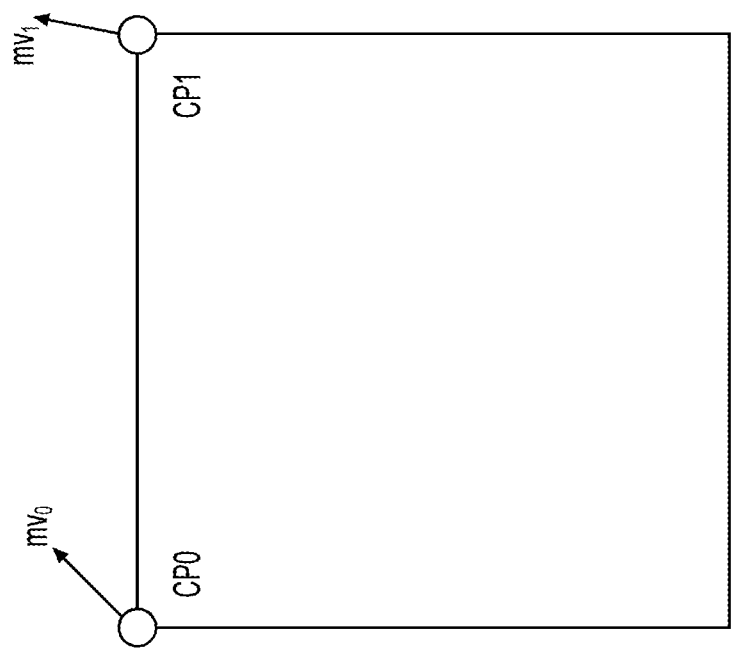

FIG. 12A shows the affine motion field of the block that is described by motion information of two control points (4-parameter affine model) and FIG. 12B shows the affine motion field of a block that is described by three control points (6-parameter affine model).

In some embodiments, the 4-parameter affine motion model, motion vector at sample location (x, y) in a block can be derived as Eq. 1, and the 6-parameter affine motion model, motion vector at sample location (x, y) in a block can be derived as Eq. 2:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{(Eq. 1)}$$

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{(Eq. 2)}$$

where ($mv_{0x}$, $mv_{0y}$) denotes the motion vector of the top-left corner control point CP0, ($mv_{1x}$, $mv_{1y}$) is motion vector of the top-right corner control point CP1, and (mv$_{2x}$, mv$_{2y}$) is motion vector of the bottom-left corner control point CP2.

In order to simplify the motion compensation prediction, block based affine transform prediction is applied.

Figure 13:
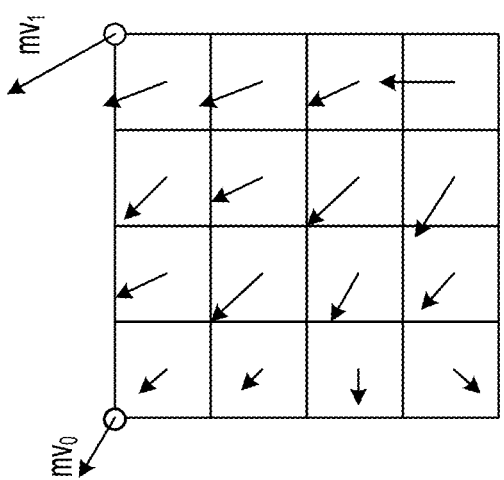
FIG. 13 shows an example of affine motion vector field per sub-block.

FIG. 13 shows an example of affine MV field per sub-block. The current CU is divided into 4×4 luma sub-blocks. To derive motion vector of each 4×4 luma sub-block, the motion vector of the center sample of each sub-block, as shown in FIG. 13, is calculated according to above equations, and rounded to 1/16 fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks in an example.

Two affine motion inter prediction modes, such as affine merge (AF_MERGE) mode and affine advanced MVP (AMVP) mode, can be used.

For affine merge prediction, in an example, AF_MERGE mode can be applied for CUs with both width and height larger than or equal to 8. In the AF_MERGE mode, the control point motion vectors (CPMVs) of the current CU are generated based on the motion information of the spatial neighboring CUs. In an example, there can be up to five CPMVP candidates and an index is signalled to indicate the one to be used for the current CU. In an example, three types of CPVM candidates are used to form the affine merge candidate list. The first type of CPMV candidates is inherited affine merge candidates that extrapolated from the CPMVs of the neighbour CUs. The second type of CPMV candidates are constructed affine merge candidates CPMVPs that are derived using the translational MVs of the neighbour CUs. The third type of CPMV candidates is Zero MVs.

In some examples, such as in VTM3, a maximum of two inherited affine candidates can be used. In an example, two inherited affine candidates are derived from affine motion models of the neighboring blocks, one from left neighboring CUs (referred to as left predictor) and one from above neighboring CUs (referred to as above predictor). In some examples, for the left predictor, the scan order is A0→A1, and for the above predictor, the scan order is B0→B1→B2. In an example, only the first inherited candidate from each side is selected. In some examples, no pruning check is performed between two inherited candidates. When a neighboring affine CU is identified, the control point motion vectors of the neighboring affine CU are used to derive the CPMVP candidate in the affine merge list of the current CU.

Figure 14:
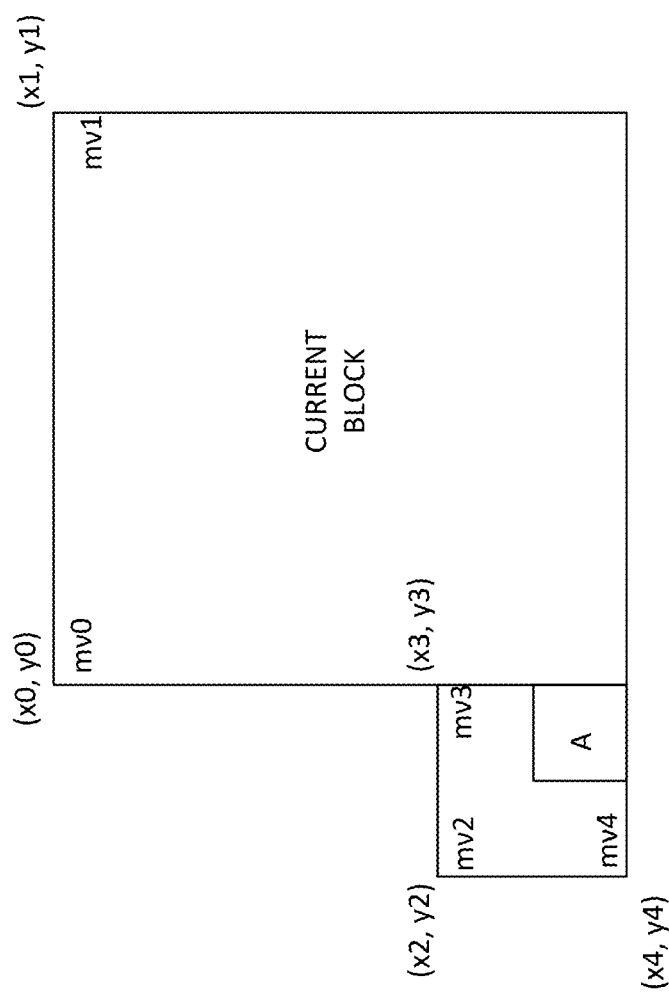
FIG. 14 shows an example for affine merge mode.

FIG. 14 shows an example for affine merge mode. As shown in FIG. 14, when the neighbour left bottom block A is coded in affine mode, the motion vectors mv$_2$, mv$_3$ and mv$_4$ of the top left corner, above right corner and left bottom corner of a CU which contains the block A are attained. When block A is coded with 4-parameter affine model, the two CPMVs of the current CU are calculated according to mv$_2$, and mv$_3$. In case that block A is coded with 6-parameter affine model, the three CPMVs of the current CU are calculated according to mv$_2$, mv$_3$ and mv$_4$.

In some examples, a constructed affine candidate is constructed by combining the neighbor translational motion information of each control point. The motion information for the control points can be derived from the specified spatial neighbors and temporal neighbor.

Figure 15:
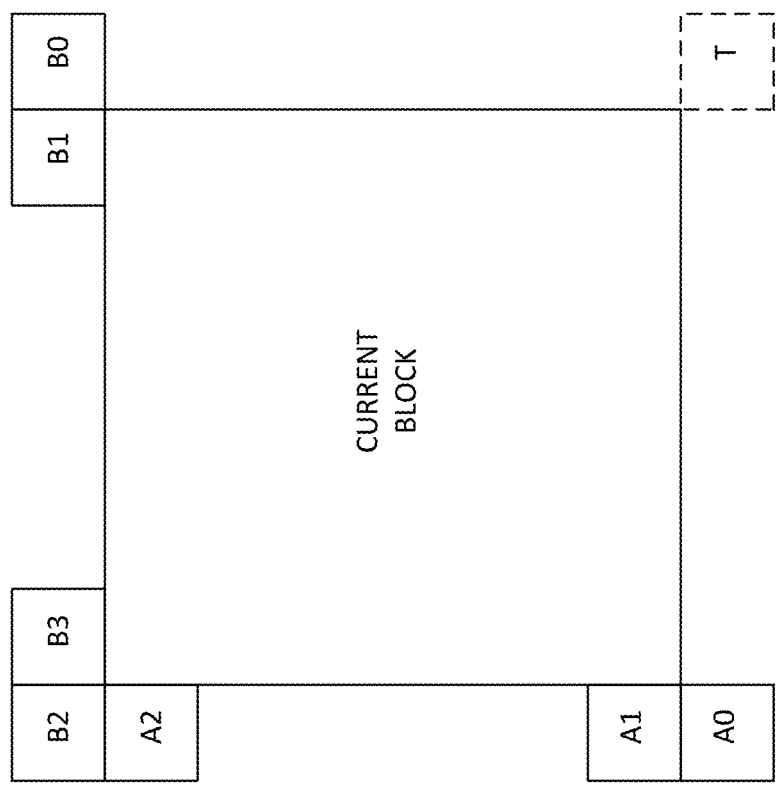
FIG. 15 shows an example of spatial neighbors and temporal neighbor according to some embodiments of the disclosure.

FIG. 15 shows an example of spatial neighbors (e.g., A0-A2 and B0-B3) and temporal neighbor (e.g., T) according to some embodiments of the disclosure. In an example, CPMV$_k$ (k=1, 2, 3, 4) represents the k-th control point. For CPMV$_1$, the B2→B3→A2 blocks are checked (→is used for checking order) and the MV of the first available block is used. For CPMV$_2$, the B1→B0 blocks are checked and for CPMV$_3$, the A1→A0 blocks are checked. For TMVP, T is checked and is used as CPMV$_4$ if the MV of the block T is available.

After MVs of four control points are attained, affine merge candidates are constructed based on that motion information. The following combinations of control point MVs are used to construct in order: {CPMV$_1$, CPMV$_2$, CPMV$_3$}, {CPMV$_1$, CPMV$_2$, CPMV$_4$}, {CPMV$_1$, CPMV$_3$, CPMV$_4$},{CPMV$_2$, CPMV$_3$, CPMV$_4$}, {CPMV$_1$, CPMV$_2$}, {CPMV$_1$, CPMV$_3$}.

The combination of 3 CPMVs can construct a 6-parameter affine merge candidate and the combination of 2 CPMVs can construct a 4-parameter affine merge candidate. In an example, to avoid motion scaling process, when the reference indices of control points are different, the related combination of control point MVs can be discarded.

In an example, after inherited affine merge candidates and constructed affine merge candidate are checked, if a candidate list is still not full, zero MVs are inserted to the end of the list.

For affine AMVP prediction, the affine AMVP mode can be applied on CUs with both width and height larger than or equal to 16. In some examples, an affine flag at CU level is signalled in the bitstream (e.g., coded video bitstream) to indicate whether affine AMVP mode is used in the CU and then another flag is signaled to indicate whether 4-parameter affine or 6-parameter affine is used. In the affine AMVP mode, the difference of the CPMVs of current CU and their predictors CPMVPs is signalled in the bitstream. The affine AMVP candidate list size is 2 and the affine AMVP candidate list is generated by using the following four types of CPVM candidate in the order: (1) inherited affine AMVP candidates that extrapolated from the CPMVs of the neighbour CUs; (2) constructed affine AMVP candidates CPMVPs that are derived using the translational MVs of the neighbour CUs; (3) translational MVs from neighboring CUs; and (4) Zero MVs.

In some examples, the checking order of inherited affine AMVP candidates is the same as the checking order of inherited affine merge candidates. In an example, the only difference between the affine merge prediction and affine AMVP prediction is that, for AMVP candidate, only the affine CU that has the same reference picture as the current block is considered. In an example, no pruning process is applied when inserting an inherited affine motion predictor into the candidate list.

In some examples, constructed AMVP candidate can be derived from the specified spatial neighbors shown in FIG. 15. In an example, the same checking order is used as done in the candidate construction for the affine merge prediction. In addition, reference picture index of the neighboring block is also checked. The first block in the checking order that is inter coded and has the same reference picture as in current CUs is used. When the current CU is coded with 4-parameter affine mode, and motion vectors of two control points mv$_0$ and mv$_1$ are both available, the motion vectors of the two control points are added as one candidate in the affine AMVP list. When the current CU is coded with 6-parameter affine mode, and all three motion vectors of the control points CPMVs are available, they are added as one candidate in the affine AMVP list. Otherwise, constructed AMVP candidate is set as unavailable.

When the number of affine AMVP list candidates is still less than 2 after inherited affine AMVP candidates and constructed AMVP candidate are checked, $mv_0$, $mv_1$ and $mv_2$ will be added, in order, as the translational MVs to predict all control point MVs of the current CU, when available. Finally, zero MVs are used to fill the affine AMVP list if the affine AMVP list is still not full.

According to some aspects of the disclosure, a motion refinement technique that is referred to as bi-directional optical flow (BDOF) mode is used in inter prediction. BDOF is also referred to as BIO in some examples. BDOF is used to refine the bi-prediction signal of a CU at the 4×4 sub-block level. BDOF is applied to a CU when the CU satisfies the following conditions: 1) the CU's height is not 4, and the CU is not in size of 4×8, 2) the CU is not coded using affine mode or the ATMVP merge mode; 3) the CU is coded using "true" bi-prediction mode, i.e., one of the two reference pictures is prior to the current picture in display order and the other is after the current picture in display order. BDOF is only applied to the luma component in some examples.

The motion refinement in the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j), k = 0, 1,$$

of the two prediction signals are computed by directly calculating the difference between two neighboring samples, i.e.

$$\frac{\partial I^{(k)}}{\partial x}(i,j) = (I^{(k)}(i+1,j) - I^{(k)}(i-1,j)) \gg 4 \quad \text{(Eq. 3)}$$

$$\frac{\partial I^{(k)}}{\partial y}(i,j) = (I^{(k)}(i,j+1) - I^{(k)}(i,j-1)) \gg 4$$

where $I^{(k)}(i,j)$ are the sample value at coordinate $(i,j)$ of the prediction signal in list k, k=0,1

Then, the auto- and cross-correlation of the gradients, $S_1$, $S_2$, $S_3$, $S_5$ and $S_6$, are calculated as $$S_1 = \Sigma_{(i,j)\in\Omega} \psi_x(i,j)\cdot\psi_x(i,j), S_3 = \Sigma_{(i,j)\in\Omega} \theta(i,j)\cdot\psi_x(i,j)$$
$$S_2 = \Sigma_{(i,j)\in\Omega} \psi_x(i,j)\cdot\psi_y(i,j) \; S_5 = \Sigma_{(i,j)\in\Omega} \psi_y(i,j)\cdot\psi_y(i,j)$$
$$S_6 = \Sigma_{(i,j)\in\Omega} \theta(i,j)\cdot\psi_y(i,j) \quad \text{(Eq. 4)}$$

where $$\psi_x(i,j) = \left(\frac{\partial I^{(1)}}{\partial x}(i,j) + \frac{\partial I^{(0)}}{\partial x}(i,j)\right) \gg n_a \quad \text{(Eq. 5)}$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = (I^{(1)}(i,j) \gg n_b) - (I^{(0)}(i,j) \gg n_b)$$

where $\Omega$ is a 6×6 window around the 4×4 sub-block.

The motion refinement $(v_x, v_y)$ is then derived using the cross- and auto-correlation terms using the following:

$$v_x = S_1 > 0?\text{clip3}(-th_{BIO}, th_{BIO}, -((S_3 \cdot 2^{nb-na}) \gg \lfloor \log_2 S_1 \rfloor)):$$
$$0 \; v_y = S_5 > 0?\text{clip3}(-th_{BIO}, th_{BIO}, -((S_6 \cdot 2^{nb-na} - ((v_x S_{2,m})\ll n_{S_2} + v_x S_{2,s})/2) \gg \lfloor \log_2 S_5 \rfloor)):0 \quad \text{(Eq. 6)}$$

where $S_{2,m} = S_2 \gg n_{S_2}$, $S_{2,s} = S_2 \& (2^{n_{S_2}} - 1)$, $th_{BIO} = 2^{13-BD}$, and $\lfloor \cdot \rfloor$ is the floor function.

Based on the motion refinement and the gradients, the following adjustment is calculated for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + \quad \text{(Eq. 7)}$$
$$rnd\left(\left(v_y\left(\frac{\partial I^{(1)}(x,y)}{\partial y} - \frac{\partial I^{(0)}(x,y)}{\partial y}\right)\right)/2\right)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) \gg \text{shift} \quad \text{(Eq. 8)}$$

In the above, the values of $n_a$, $n_b$ and $n_{S_2}$ are equal to 3, 6, and 12, respectively. These values are selected such that the multipliers in the BDOF process do not exceed 15-bit, and the maximum bit-width of the intermediate parameters in the BDOF process is kept within 32-bit.

To derive the gradient values, some prediction samples $I^{(k)}(i,j)$ in list k (k=0,1) outside of the current CU boundaries can be generated.

Figure 16:
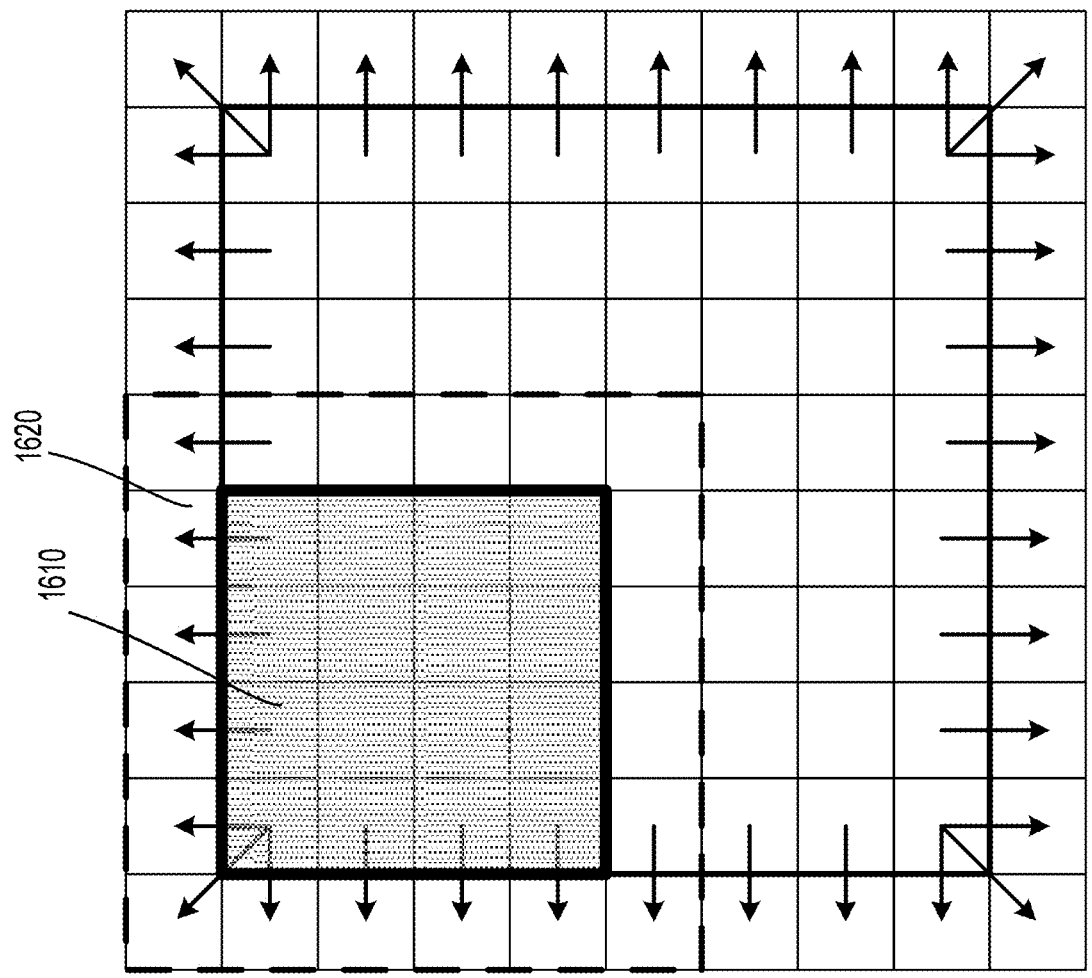
FIG. 16 shows an example of extended CU region in bi-directional optical flow (BDOF).

FIG. 16 shows an example of extended CU region in BDOF. In the FIG. 16 example, a 4×4 CU (1610) is shown as a shaded area. The BDOF uses one extended row/column around the CU's boundaries, and the extended area is shown as a 6×6 block (1620) of dashed line. To control the computational complexity of generating the out-of-boundary prediction samples, bilinear filter is used to generate prediction samples in the extended area (white positions), and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

In some examples, triangle partition can be used in inter prediction. For example (e.g., VTM3), a new triangle partition mode is introduced for inter prediction. The triangle partition mode is only applied to CUs that are 8×8 or larger and are coded in skip or merge mode. For a CU satisfying these conditions, a CU-level flag is signaled to indicate whether the triangle partition mode is applied or not.

When the triangular partition mode is used, a CU is split evenly into two triangle-shaped partitions, using either the diagonal split or the anti-diagonal split.

Figure 17:
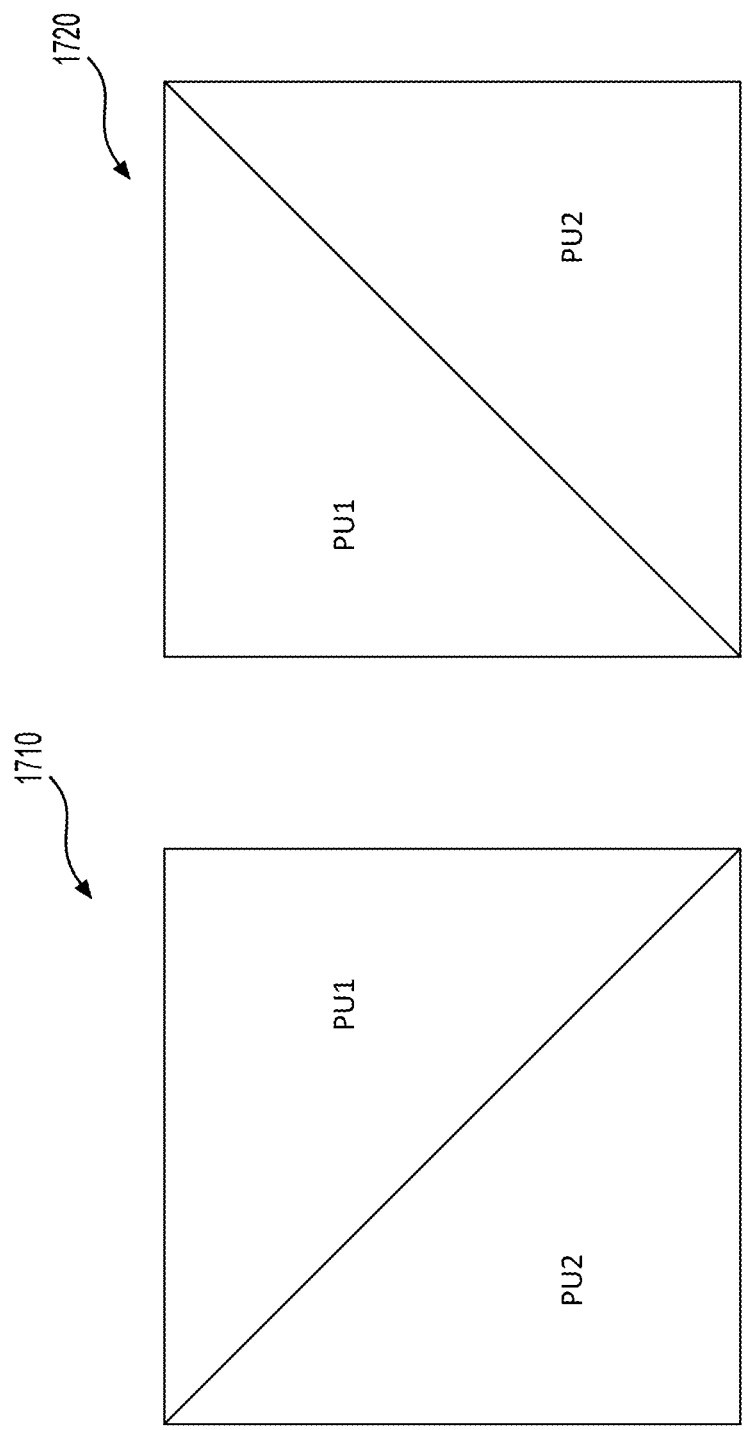
FIG. 17 shows the diagonal split of a CU and the anti-diagonal split of a CU.

FIG. 17 shows the diagonal split of a CU and the anti-diagonal split of a CU. Each triangle partition in a CU has its own motion information, and can be inter-predicted using its own motion. In an example, only uni-prediction is allowed for each triangle partition. Then each partition has one motion vector and one reference index. The uni-prediction motion constraint is applied to ensure that same as the conventional bi-prediction, only two motion compensated prediction are needed for each CU. The uni-prediction motion for each partition is derived from a uni-prediction candidate list constructed using the process.

In some examples, when a CU-level flag indicates that the current CU is coded using the triangle partition mode, then an index in the range of [0, 39] is further signaled. Using this triangle partition index, the direction of the triangle partition (diagonal or anti-diagonal), as well as the motion for each of the partitions can be obtained through a look-up table. After predicting each of the triangle partitions, the sample values along the diagonal or anti-diagonal edge are adjusted using a blending processing with adaptive weights. After the whole CU is predicted, the transform and quantization process will be applied to the whole CU as in other prediction modes. Finally, the motion field of a CU predicted using the triangle partition mode is stored in 4×4 units.

In some embodiments, generalized bi-prediction (GBi) is used in inter prediction. With GBi, the bi-prediction $P_{bi\text{-}pred}$ is generated using (Eq. 9) with one weighting parameter signalled for the coded coding unit (CU), where $P_0$ and $P_1$ are motion compensated predictions using reference picture in list-0 (L0) and list-1 (L1), respectively. w is weighting parameter for list-1 prediction represented in ⅛ precision in an example.

$$P_{bi\text{-}pred}=((8-w)\times P_0+w\times P_1+4)\gg 3 \quad \text{(Eq. 9)}$$

In an exemplary GBi design, there are 5 weights {−2/8, 3/8, 4/8, 5/8, 10/8} available for low-delay picture and 3 weights {3/8, 4/8, 5/8} for non-low-delay picture. In inter prediction mode, if bi-prediction is used and the CU area is smaller than 128 luma samples, GBi is disabled without any signaling.

In some embodiments, weighted prediction (WP) is a tool provided in for example HEVC. WP corresponds to the equivalent tool present in AVC and is intended to improve the performance of inter prediction when the source material is subject to illumination variations, e.g. when using fading or cross-fading.

In some examples, according to WP, the inter prediction signal P is replaced by a linear weighted prediction signal P' (with weight w and offset o), for example according to (Eq. 10) for uni-prediction:

$$\text{Uni-prediction: } P'=w\times P+o \quad \text{(Eq. 10)}$$

For bi-prediction, inter prediction signal P0 is for reference L0, weight w0 and offset o0 are for the reference L0, and inter prediction signal P1 is for reference L1, weight w1 and offset o1 are for the reference L0, then the linear weighted predicton signal P' can be calculated according to (Eq. 11):

$$\text{Bi-prediction: } P'=(w0\times P0+o0+w1\times P1+o1)/2 \quad \text{(Eq. 11)}$$

The applicable weights and offsets are selected by the encoder and are conveyed within the bitstream from encoder to the decoder. L0 and L1 suffixes define List0 and List1 of the reference pictures list, respectively. Bit depth is maintained to 14-bit accuracy (in HEVC Version 1) before averaging the prediction signals, as for interpolation filters.

In some cases of bi-prediction with at least one reference picture available in each list L0 and L1, (Eq. 12) are used to the explicit signaling of weighted prediction parameters relating to the luma channel:

$$\begin{aligned}predSamples[x][y]=&\text{Clip3}(0,(1\ll bitDepth)-1,(pred\text{-}\\&SamplesL0[x][y]\times w0+predSamplesL1[x][y]\times w1+\\&((o0+o1+1)\ll \log 2WD))\gg(\log 2WD+1))\end{aligned} \quad \text{(Eq. 12)}$$

where
log2WD=luma_log2_weight_denom+14-bitDepth
w0=LumaWeightL0[refIdxL0], w1=LumaWeightL1[refIdxL1]
o0=luma_offset_10[refIdxL0]×highPrecisionScaleFactor
o1=luma_offset_11[refIdxL1]×highPrecisionScaleFactor
highPrecisionScaleFactor=(1≪(bitDepth−8))

It is noted that a corresponding formula can be applied to the chroma channel and to the case of uni-prediction.

In some embodiments, a highPrecisionScaleFactor of (1≫(bitDepth−8)) is applied to the weighted prediction offsets o0 and o1 when high_precision_offsets_enabled_flag is equal to zero. At higher bit depths, this factor increases in magnitude, reducing the performance of weighted prediction.

When the high_precision_offsets_enabled_flag is equal to one (permitted in RExt profiles), the offsets (o0 and o1) have the same precision as the input (i.e. the factor above is removed) in order to provide enough precision for the weighted prediction process.

According to an aspect of the disclosure, decoder side motion vector refinement (DMVR) is one of the decoder side motion vector derivation (DMVD) techniques and is used to improve/refine MV based on starting points.

In some examples, in the case of bi-prediction operation, for the prediction of one block region, two prediction blocks, formed respectively using an MV0 of a first candidate list list0 and an MV1 of a second candidate list list1, are combined to form a single prediction signal that is referred to as a bilateral template. In the DMVR method, the two motion vectors MV0 and MV1 of the bi-prediction are further refined by a bilateral template matching process. The bilateral template matching applied in the decoder to perform a distortion-based search between the bilateral template and the reconstruction samples in the reference pictures to obtain a refined MV without transmission of additional motion information.

Figure 18:
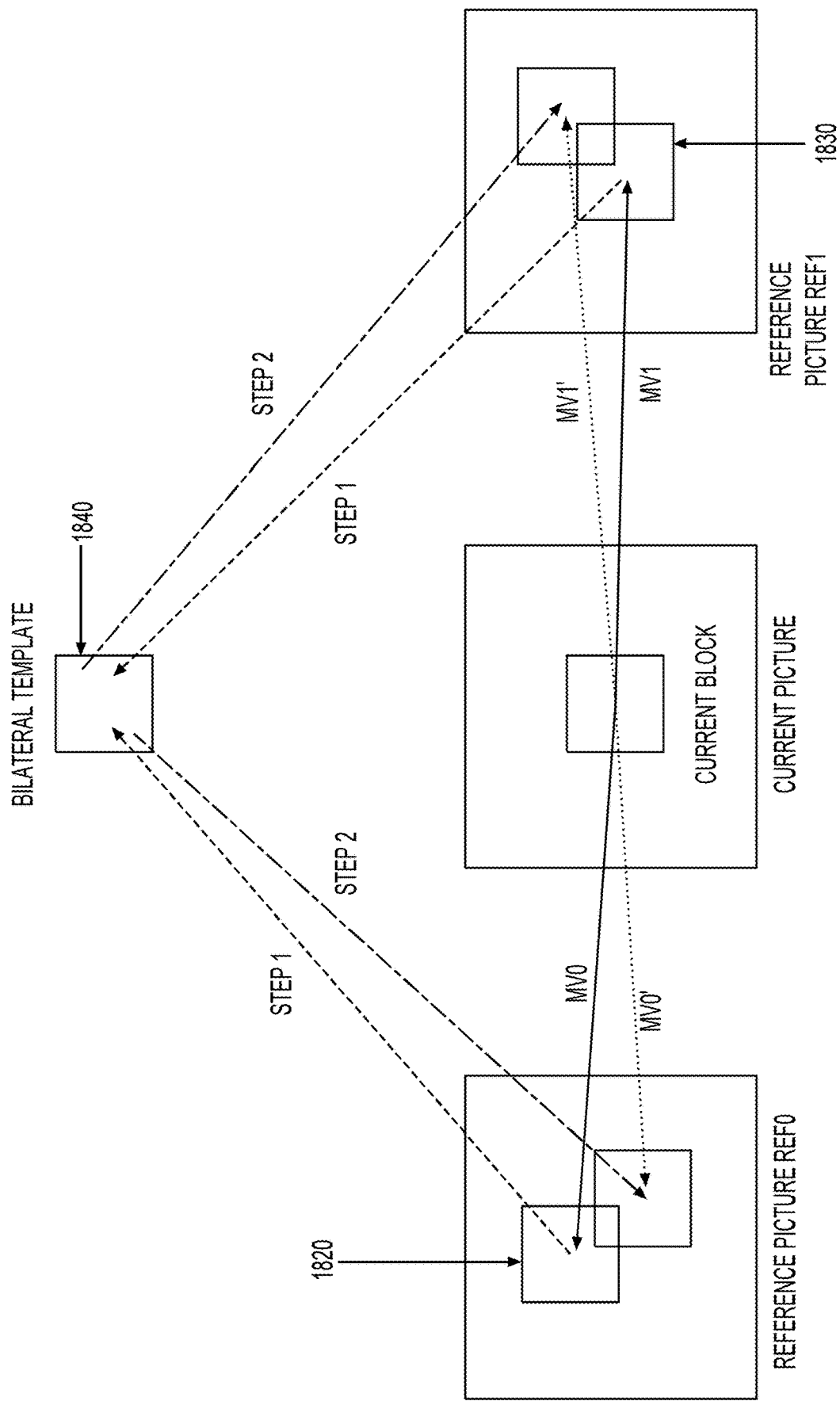
FIG. 18 shows an example of DMVR that is based on bilateral template matching.

FIG. 18 shows an example of DMVR that is based on bilateral template matching. In DMVR, the bilateral template (1840) is generated as the weighted combination (i.e. average) of the two prediction blocks (1820) and (1830), from the initial MV0 of the first candidate list list0 and MV1 of the second candidate list list1, respectively, as shown in FIG. 18. The template matching operation includes calculating cost measures between the generated template (1840) and the sample region (around the initial prediction block) in the reference pictures Ref0 and Ref1. For each of the two reference pictures Ref0 and Ref1, the MV that yields the minimum template cost is considered as the updated MV of that list to replace the original MV. For example, MV0' replaces MV0, and MV1' replaces MV1. In some examples, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 8, are used for generating the final bi-prediction results for the current block. A sum of absolute differences (SAD) can be used as the cost measure.

In some examples, DMVR is applied for the merge mode of bi-prediction with one MV from a reference picture in the past and another MV from a reference picture in the future, without the transmission of additional syntax elements. In an example, DMVR is applied in the merge mode and skip mode, when the condition in (Eq. 13) is true:

$$(POC-POC0)\times(POC-POC1)<0 \quad \text{(Eq. 13)}$$

where POC denotes picture order counter of the current picture, and POC0 and POC1 denote picture order counts of the two reference pictures for the current picture.

In some embodiments, based on signals in the received bitstream, a pair of merge candidates is determined and used as input to DMVR process. For example, the pair of merge candidates is denoted as initial motion vectors (MV0, MV1).

In some examples, the search points that are searched by DMVR obey the motion vector difference mirroring condition. In other words, the points that are checked by DMVR, denoted by a pair of candidate motion vectors (MV0', MV1'), obey (Eq. 14) and (Eq. 15):

$$MV0'=MV0+MV_{diff} \quad \text{(Eq. 14)}$$

$$MV1'=MV1-MV_{diff} \quad \text{(Eq. 15)}$$

where $MV_{diff}$ denotes the motion vector difference between a candidate motion vector and an initial motion vector in one of the reference pictures.

Figure 19:
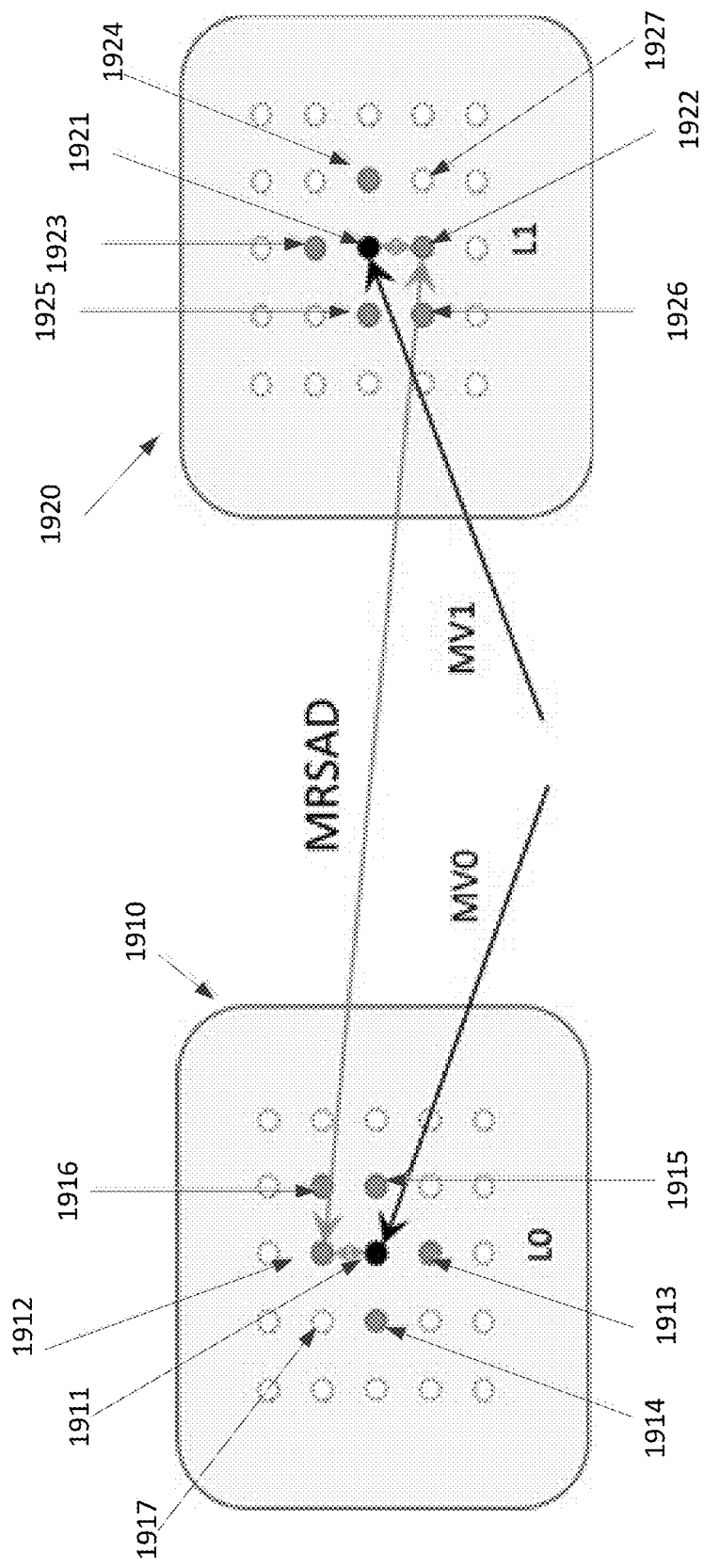
FIG. 19 shows a diagram of search space according to an embodiment of the disclosure.

FIG. 19 shows a diagram of a first portion (1910) of the search space in a first reference picture and a second search portion (1920) of the search space in a second reference picture according to an embodiment of the disclosure. The initial motion vector MV0 points to a point (1911) in the first portion (1910) of the search space, and the initial motion vector MV1 points to a point (1921) in the second portion (1920) of the search space. Further, the candidate motion vector MV0' points to a point (1912) in the first portion (1910) of the search space, and the candidate motion vector MV1' points to a point (1922) in the second portion (1920) of the search space. The points (1912) and (1922) satisfy the motion vector difference mirroring condition. Similarly, points (1913) and (1923) satisfy the motion vector difference mirroring condition; points (1914) and (1924) satisfy the motion vector difference mirroring condition; points (1915) and (1925) satisfy the motion vector difference mirroring condition; and points (1916) and (1926) satisfy the motion vector difference mirroring condition. In the FIG. 19 example, 6 pairs of search points are selected in the search space, and the points (1911) and (1921) are referred to as center points of the search space.

In some examples, after the construction of the search space, the uni-lateral predictions are respectively performed on the search points in the first portion (1910) and the second portion (1920) of the search space using interpolation filters, such as discrete cosine transform (DCTIF) interpolation filter. Further, bilateral matching cost function is calculated by using mean reduced sum of average difference (MRSAD) between the two uni-lateral predictions for each pair of search points, and then pair of the search points that results of the minimum cost (minimum bilateral matching cost, minimum MRSAD) is selected as the refined MV pair. In an example, for the MRSAD calculation, 16-bit precision of samples is used (which is the output of the interpolation filtering), and no clipping and no rounding operations are applied before MRSAD calculation. The reason for not applying rounding and clipping is to reduce internal buffer requirement.

In some embodiments, the integer precision search points are chosen using an adaptive pattern method. In an example, the cost (bilateral matching cost) corresponding to the central points (such as (1911) and (1921) pointed by the initial motion vectors) is calculated firstly. The 4 other costs, such as cost corresponding to points (1912) and (1922), cost corresponding to points (1913) and (1923), cost corresponding to points (1914) and (1924), and cost corresponding to points (1915) and (1925), are calculated. The distance from the points (1912)-(1915) to the center point (1911) is integer number of sample resolution, such as 1 pixel (1-pel), and the distance from the points (1922)-(1925) to the center point (1921) is also integer number of sample resolution.

Then, based on the result of the 4 other costs, the $6^{th}$ pair of search points, such as the points (1916) and (1926) are chosen by the gradient of the previous calculated costs. For example, when the cost of the search points (1912) and (1922) is smaller than the cost of the search points (1912) and (1923), and the cost of the search points (1915) and (1925) is smaller than the cost of the search points (1914) and (1924), then the points (1916) and (1926) are selected as the $6^{th}$ pair of search points. In another example, when the cost of the search points (1912) and (1922) is smaller than the cost of the search points (1912) and (1923), and the cost of the search points (1914) and (1924) is smaller than the cost of the search points (1915) and (1925), then the points (917) and (927) are selected as the $6^{th}$ pair of search points. Then, within the 6 pairs of search points, the pair of search points with the minimal cost is used to determine the refined motion vector pair (corresponding o the pair of search points with the minimal cost) that is the output of one iteration of the DMVR process.

In some embodiments, after one iteration, when the minimum cost is achieved at the central points (e.g., 1911 and 1921) of the search space, i.e. the motion vectors are not changed, and the refinement process is terminated. Otherwise, the search points with the minimal cost are used as the new center points to start another iteration of the DMVR process. For example, when the points (1916) and (1926) have the minimal cost, then points (1916) and (1926) are used as center points to continue a next iteration of DMVR process when the search range is not exceeded.

In some examples, when the integer precision search is terminated, half sample precision search is applied when the application of half-pel search does not exceed the search range.

Figure 20:
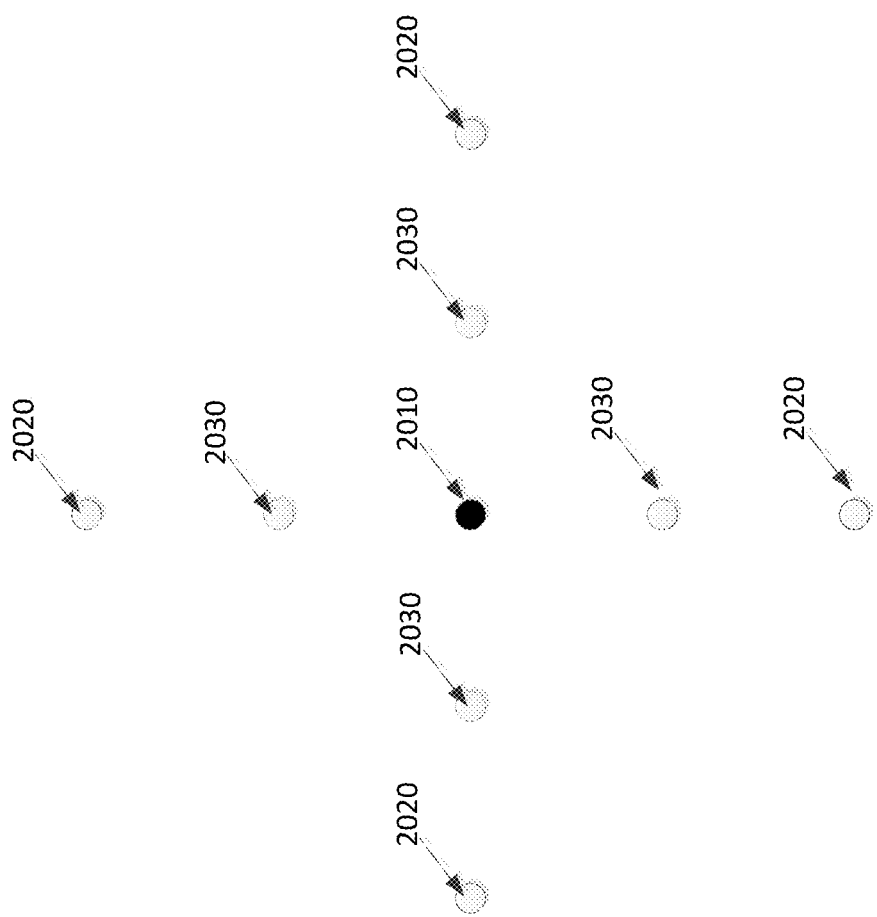
FIG. 20 shows a diagram for half-sample precision search in an example.

FIG. 20 shows a diagram for half-sample precision search in an example. In the FIG. 20 example, four search points (2020) are distanced to the center point (2010) by 1 pixel (1-pel), and can be used as the integer precision search points (e.g., points 912-915). Further, the four points (2030) are distanced to the center point (2010) by half pixel, and are used in the half-sample precision search. Similarly to the integer sample precision search, 4 MRSAD calculations are performed, corresponding to four pair of points with half-pel distance to the center points. In an example, the central points in the half-sample precision search correspond to the refined motion vector pair that is resulted from the integer precision search with the minimal cost.

According to some aspects of the disclosure, various changes are made to improve DMVR efficiency.

In an example, a padding technique is used to avoid increase in memory access relative to bi-prediction by performing interpolation with padded sample for sample positions outside an area, such as (CU_w+7)×(CU_h+7), where CU_w denotes the width of the CU and CU_h denotes height of the CU.

In another example, bilinear interpolation for refinement is used to avoid the increase in DCTIF based motion compensation complexity due to refinement search range.

In another example, cost is computed every other row to reduce the cost evaluation complexity.

In some embodiments, restrictions are applied to determine whether DMVR is allowed.

In an example, for CUs with height >=8 and CU_w× CU_h>=64, DMVR is allowed. The restriction is set in order to cap the worst-case compute operations.

In another example, for CUs with luma sample count greater than 1024 samples, DMVR is allowed. The restriction is set in order to limit the internal memory requirements of DMVR.

In another example, when the MV distance from the MV corresponding to the signaled merge index to MVs of previous merge indices is less than a threshold, then the DMVR is allowed.

In another example, when the SAD cost between L0 and L1 interpolated samples with zero delta-MV is less than a threshold, then the DMVR is allowed.

In another example, a block can be divided into sub-blocks that each has a width and height of 16 or 32. Then, DMVR can be applied at the sub-block level.

According to some aspects of the disclosure, various decoder side motion vector derivation (DMVD) processes, such as BDOF and DMVR and the like can derive an MV or refine an existing MV at the decoder side. In some examples, the motion information is not transmitted, thus the DMVD has noticeable gain in coding performance. However, the MV derivation process has high complexity and may decrease the throughput of the decoding pipeline.

Aspects of the disclosure provide methods and apparatuses to reduce complexity and reduce latency in the DMVD in the inter prediction of a video codec. The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

According to an aspect of the disclosure, DMVD processes, such as DMVR and BDOF and the like are not applied at the same time in the same block. Thus, at a time to determine a usage of a DMVD process, the status of other DMVD process(es) is also checked. In an embodiment, whether to use BDOF for a block is not only dependents on BDOF's own constraints, (such as BODF is enabled at sequence/picture/slice/tile level and a block is bi-directional inter predicted and the current picture is temporally in the middle of the two references to apply BDOF), but also dependents on DMVR status. The DMVR status includes, but not limited to whether DMVR is used for a block, whether DMVR is regarded as enabled for a block, whether DMVR is activated, or deactivated, and the like.

In some examples, DMVR is regarded as enabled based on certain conditions and the combinations of the conditions. When the conditions are not satisfied, DMVR is regarded as disabled, then when the conditions of the block satisfy the BDOF constrains, BDOF can be applied for the block.

In an embodiment, DMVR is regarded as enabled when the DMVR refinement process is used or to be used for a block.

In another embodiment, when DMVR is enabled, another check is performed to test whether DMVR is activated in current block. When the DMVR process is determined to be activated, then BDOF will be disabled; and otherwise, BDOF can be enabled. In some examples, during regular inter bi-prediction, two uni-predictions are performed. For each uni-prediction, one prediction block is generated from the reference picture. In the uni-prediction in DMVR, more than one prediction blocks are generated. To align with regular inter prediction, in an example, the DMVR activation test will not fetch more than one reference blocks from the reference picture for any uni-prediction of current block. In one example, an early skip condition (or early termination condition) for DMVR is used as to determine DMVR activation status. When the early skip condition is true, then DMVR is considered as not activated, and thus BDOF can be activated; and when the early skip condition is false, then the DMVR is considered as activated, and the BDOF can be disabled. Alternatively, in an example, when early skip condition is checked to be true, BDOF is disabled even DMVR is not activated.

In another embodiment, DMVR is regarded as enabled when the block is in merge mode and have two motion vectors pointing two different reference pictures and none of the reference pictures is current picture. Then, based on the status of the DMVR, the usage of BDOF can be determined.

In another embodiment, DMVR is regarded as disabled when MVD information is signaled. For example, when the block is not in merge mode, or the block is in MMVD mode, DMVR is regarded as disabled.

In another embodiment, DMVR is regarded as disabled when triangle merge is used.

In another embodiment, DMVR is regarded as disabled when the block is in affine mode.

In another embodiment, DMVR is regarded as disabled when some restriction conditions are not met. In an example, when the condition of height $>=8$ and $CU\_w \times CU\_h >= 64$ is not met, DMVR is regarded as disabled. In another example, when the condition that luma sample count is greater than 1024 samples has not been met for the block, DMVR is regarded as disabled for the block. In another example, the condition that the MV distance from the MV corresponding to the signaled merge index to MVs of previous merge indices is less than a threshold has not been met for the block, then the DMVR is regarded as disabled for the block. In another example, when the condition that the SAD cost between L0 and L1 interpolated samples with zero delta-MV is less than a threshold has not been met, then the DMVR is regarded as been disabled.

In another embodiment, DMVR is regarded as disabled, when GBi is used for the block.

In another embodiment, DMVR is regarded as disabled when weighted prediction is used for the block.

In another embodiment, the DMVR enabling condition is checked for each sub-block in DMVR. When DMVR is considered as enabled in each sub-block, then DMVR is considered as enabled in current block.

In another embodiment, each sub-block has its own DMVR status, then BDOF may be enabled for some sub-blocks of the current block while may be disabled for other sub-blocks of the current block.

Figure 21:
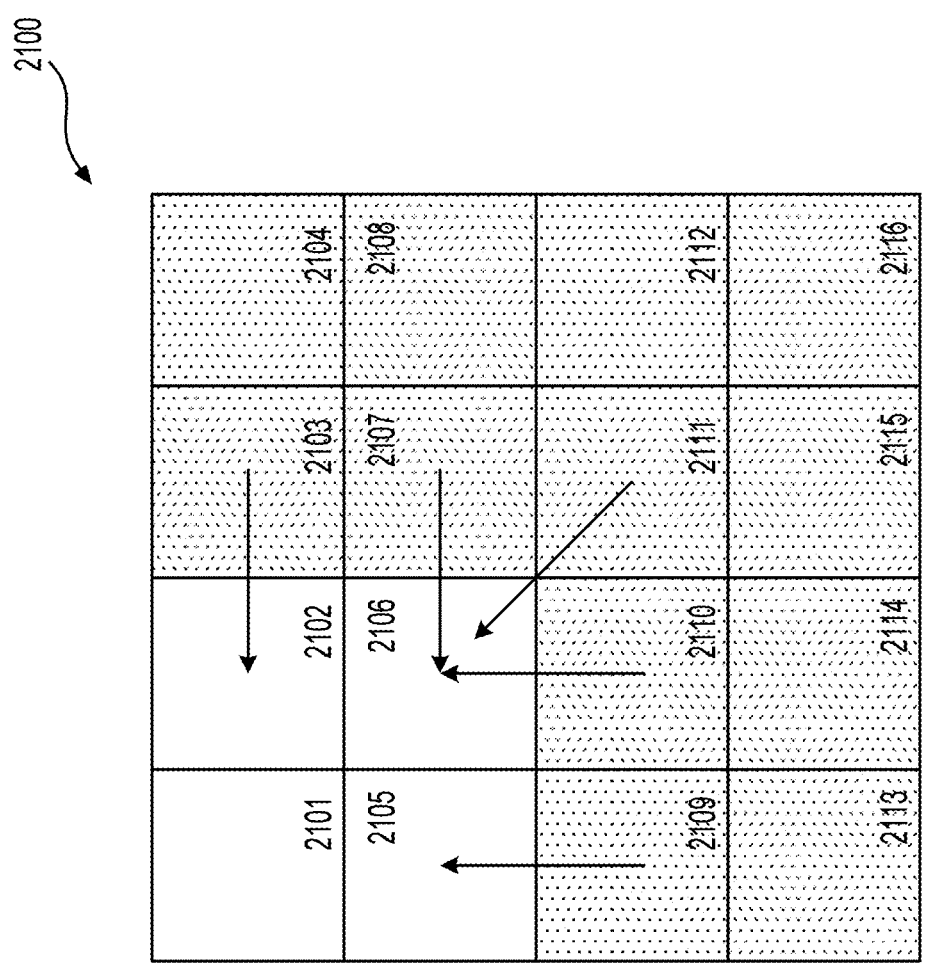
FIG. 21 shows an example for encoding/decoding process based on sub-blocks according to an embodiment of the disclosure.

FIG. 21 shows a current block (2100) that is divided into sub-blocks (2101)-(2116). In the FIG. 21 example, BDOF is disabled in the upper-left 2×2 sub-blocks (2101), (2102), (2105) and (2106), and is enabled in the remaining sub-blocks. In some embodiments, each sub-block may further include one or more sub-PUs. Each sub-PU has a fixed size, e.g., 4×4 or 8×8. In an example, when DMVR is considered as enabled in all the sub-PUs within a sub-block, then DMVR is considered as enabled in the sub-block.

In some embodiments, when BDOF is enabled on a sub-block and disabled on a neighboring sub-block, the gradient computation across the boundary between the sub-block and the neighboring sub-block can use padded pixels. In an example, the padding can be applied similarly or in the same way as at the CU boundary. In the FIG. 21 example, the boundary between BDOF-enabled sub-blocks and BDOF-disabled sub-blocks can be regarded in the same way as CU boundary. Padding can be used when the BDOF gradient calculation is across this boundary (as indicated by the arrows).

Figure 22:
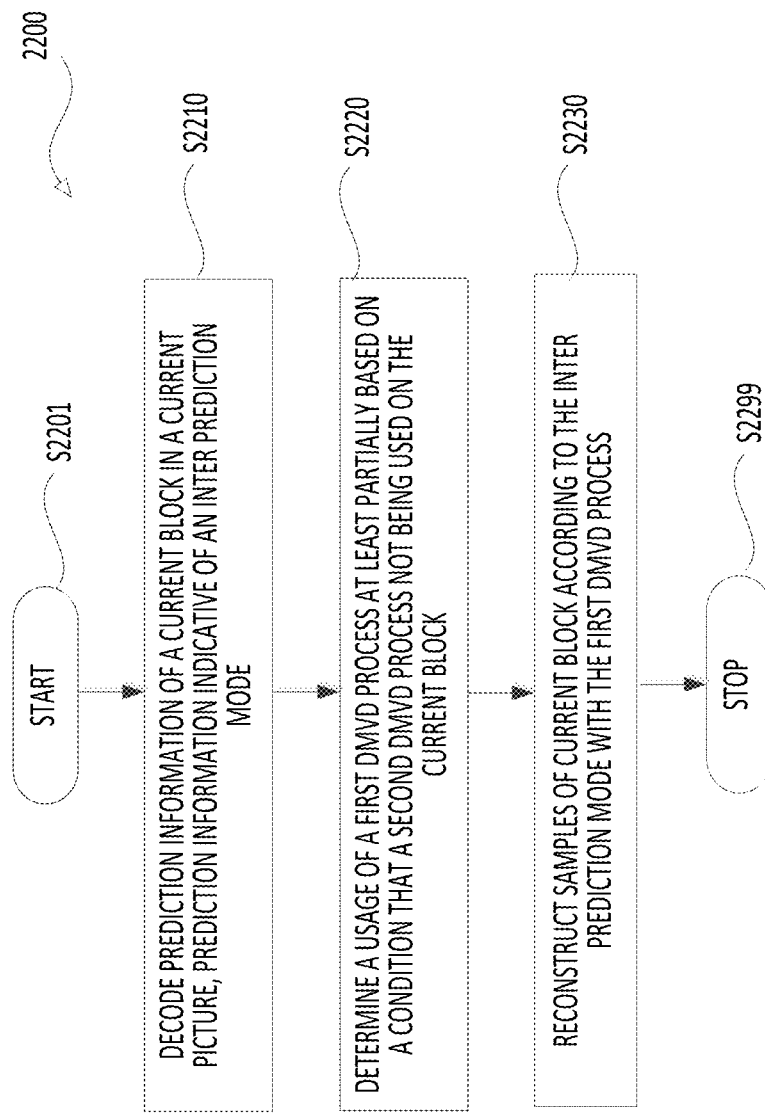
FIG. 22 shows a flow chart outlining a process example according to an embodiment of the disclosure.

FIG. 22 shows a flow chart outlining a process (2200) according to an embodiment of the disclosure. The process (2200) can be used in the reconstruction of a block coded in intra mode, so to generate a prediction block for the block under reconstruction. In various embodiments, the process (2200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (2200) is implemented in software instructions, thus when the processing circuitry executes the software instructions, the processing circuitry performs the process (2200). The process starts at (S2201) and proceeds to (S2210).

At (S2210), prediction information of a current block is decoded from a coded video bitstream. The prediction information is indicative of a prediction of the current block based on an inter prediction mode.

At (S2220), a usage of a first DMVD process is determined at least partially based on a second DMVD process not being used on the current block. According to an aspect of the disclosure, DMVD processes, such as DMVR and BDOF and the like take relative large computation. When the DMVD processes are not allowed to apply at the same time in the same block, computation complexity can be reduced, and latency can be reduced. In an embodiment, whether to use BDOF for a block is not only dependents on BDOF's own constraints, (such as BODF is enabled at sequence/picture/slice/tile level and a block is bi-directional inter predicted and the current picture is temporally in the middle of the two references to apply BDOF), but also dependents on DMVR status. In some embodiments, when DMVR status is disabled, or deactivated, or earlier terminated, then BDOF can be used when BDOF constraints are met. Similarly, in some embodiments, when BDOF status is disabled, or deactivated, or earlier terminated, then DMVR can be used when DMVR constraints are met.

At (S2230), samples of the current block are constructed based on the inter prediction mode with the first DMVD process. Then, the process proceeds to (S2299), and terminates.

The techniques described above, can be implemented as computer software using computer-readable instructions and physically stored in one or more computer-readable media. For example, FIG. 23 shows a computer system (2300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 23:
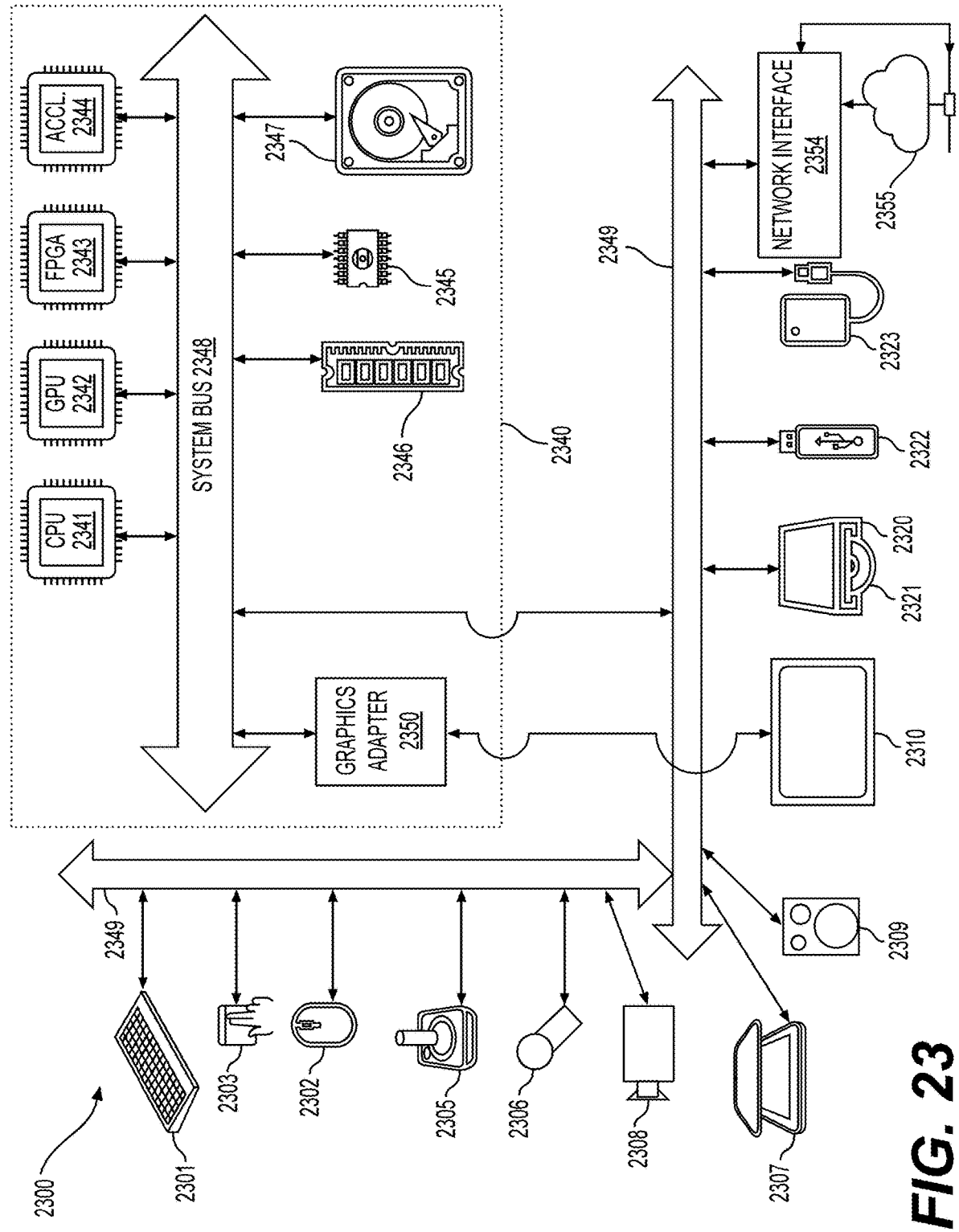
FIG. 23 is a schematic illustration of a computer system in accordance with an embodiment.

The components shown in FIG. 23 for computer system (2300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2300).

Computer system (2300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2301), mouse (2302), trackpad (2303), touch screen (2310), data-glove (not shown), joystick (2305), microphone (2306), scanner (2307), camera (2308).

Computer system (2300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2310), data-glove (not shown), or joystick (2305), but there can also be tactile feedback devices that do not serve as input devices), audio output devices (such as: speakers (2309), headphones (not depicted)), visual output devices (such as screens (2310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2300) can also include human accessible storage devices and their associated media such as optical media including CD/DVD ROM/RW (2320) with CD/DVD or the like media (2321), thumb-drive (2322), removable hard drive or solid state drive (2323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2349) (such as, for example USB ports of the computer system (2300)); others are commonly integrated into the core of the computer system (2300) by attachment to a system bus as described below (for example Ethernet interface into a PC computer system or cellular network interface into a smartphone computer system). Using any of these networks, computer system (2300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2340) of the computer system (2300).

The core (2340) can include one or more Central Processing Units (CPU) (2341), Graphics Processing Units (GPU) (2342), specialized programmable processing units in the form of Field Programmable Gate Areas (FPGA) (2343), hardware accelerators for certain tasks (2344), and so forth. These devices, along with Read-only memory (ROM) (2345), Random-access memory (2346), internal mass storage such as internal non-user accessible hard drives, SSDs, and the like (2347), may be connected through a system bus (2348). In some computer systems, the system bus (2348) can be accessible in the form of one or more physical plugs to enable extensions by additional CPUs, GPU, and the like. The peripheral devices can be attached either directly to the core's system bus (2348), or through a peripheral bus (2349). Architectures for a peripheral bus include PCI, USB, and the like.

CPUs (2341), GPUs (2342), FPGAs (2343), and accelerators (2344) can execute certain instructions that, in combination, can make up the aforementioned computer code. That computer code can be stored in ROM (2345) or RAM (2346). Transitional data can be also be stored in RAM (2346), whereas permanent data can be stored for example, in the internal mass storage (2347). Fast storage and retrieve to any of the memory devices can be enabled through the use of cache memory, that can be closely associated with one or more CPU (2341), GPU (2342), mass storage (2347), ROM (2345), RAM (2346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2300), and specifically the core (2340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2340) that are of non-transitory nature, such as core-internal mass storage (2347) or ROM (2345). The software implementing various embodiments of the present disclosure can be stored in such devices and executed by core (2340). A computer-readable medium can include one or more memory devices or chips, according to particular needs. The software can cause the core (2340) and specifically the processors therein (including CPU, GPU, FPGA, and the like) to execute particular processes or particular parts of particular processes described herein, including defining data structures stored in RAM (2346) and modifying such data structures according to the processes defined by the software. In addition or as an alternative, the computer system can provide functionality as a result of logic hardwired or otherwise embodied in a circuit (for example: accelerator (2344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding prediction information of a current block in a current picture from a coded video bitstream, the prediction information being indicative of an inter prediction mode;
determining, for each of a plurality of sub-blocks of the current block, a usage of a first (decoder-side motion vector derivation) DMVD process on the respective sub-block of the current block at least partially based on whether a second DMVD process is determined to be used on the respective sub-block of the current block;
enabling the first DMVD process on a first sub-block of the plurality of sub-blocks of the current block;
disabling the first DMVD process on a second sub-block of the plurality of sub-blocks of the current block;
padding the second sub-block of the plurality of sub-blocks that is disabled for the first DMVD process during a gradient calculation using the first sub-block of the plurality of sub-blocks that is enabled for the first DMVD process; and
reconstructing the plurality of sub-blocks of the current block according to the inter prediction mode with the first DMVD process based on the determination for each of the plurality of sub-blocks,
wherein the second sub-block neighbors the first sub-block.

2. The method of claim 1, wherein the first DMVD process is decoder side motion vector refinement (DMVR), and the second DMVD process is bi-directional optical flow (BDOF).

3. The method of claim 1, wherein the first DMVD process is bi-directional optical flow (BDOF), and the second DMVD process is decoder side motion vector refinement (DMVR).

4. The method of claim 3, wherein the DMVR is regarded as disabled when the inter prediction mode is one of a triangle merge mode, an affine mode, a generalized bi-prediction (GBi) mode, a weighted prediction mode.

5. The method of claim 3, further comprising:
checking enable/disable status of DMVR on the plurality of sub-blocks of the current block; and
enabling/disabling DMVR for the current block based on the status of DMVR on the plurality of sub-blocks.

6. The method of claim 3, further comprising:
enabling BDOF on a first subset of the plurality of sub-blocks of the current block; and
disabling BDOF on a second subset of the plurality of sub-blocks of the current block.

7. The method of claim 6, wherein the padding comprises:
padding the second sub-block of the plurality of sub-blocks that is disabled for BDOF during a BDOF gradient calculation from the first sub-block of the plurality of sub-blocks that is enabled for BDOF.

8. The method of claim 1, further comprising:
determining the usage of the first DMVD process on the respective sub-block of the current block when the second DMVD process is disabled for the respective sub-block of the current block.

9. The method of claim 1, further comprising:
determining, when the second DMVD process is enabled, whether the second DMVD process is activated; and
disabling the first DMVD process when the second DMVD process is activated.

10. The method of claim 1, further comprising:
determining the usage of the first DMVD process when an early skip condition is true for the second DMVD process.

11. An apparatus for video decoding, comprising:
processing circuitry configured to:
decode prediction information of a current block in a current picture from a coded video bitstream, the prediction information being indicative of an inter prediction mode;
determine, for each of a plurality of sub-blocks of the current block, a usage of a first (decoder-side motion vector derivation) DMVD process on the respective sub-block of the current block at least partially based on whether a second DMVD process is determined to be used on the respective sub-block of the current block;
enable the first DMVD process on a first sub-block of the plurality of sub-blocks of the current block;
disable the first DMVD process on a second sub-block of the plurality of sub-blocks of the current block;
pad the second sub-block of the plurality of sub-blocks that is disabled for the first DMVD process during a gradient calculation using the first sub-block of the plurality of sub-blocks that is enabled for the first DMVD process; and
reconstruct the plurality of sub-blocks of the current block according to the inter prediction mode with the first DMVD process based on the determination for each of the plurality of sub-blocks,
wherein the second sub-block neighbors the first sub-block.

12. The apparatus of claim 11, wherein the first DMVD process is decoder side motion vector refinement (DMVR), and the second DMVD process is bi-directional optical flow (BDOF).

13. The apparatus of claim 11, wherein the first DMVD process is bi-directional optical flow (BDOF), and the second DMVD process is decoder side motion vector refinement (DMVR).

14. The apparatus of claim 13, wherein the DMVR is regarded as disabled when the inter prediction mode is one of a triangle merge mode, an affine mode, a generalized bi-prediction (GBi) mode, a weighted prediction mode.

15. The apparatus of claim 13, wherein the processing circuitry is configured to:
check enable/disable status of DMVR on the plurality of sub-blocks of the current block; and
enable/disable DMVR for the current block based on the status of DMVR on the plurality of sub-blocks.

16. The apparatus of claim 13, wherein the processing circuitry is configured to:
enable BDOF on a first subset of the plurality of sub-blocks of the current block; and
disable BDOF on a second subset of the plurality of sub-blocks of the current block.

17. The apparatus of claim 16, wherein
the gradient calculation is a BDOF gradient calculation, and
the processing circuitry is configured to pad the second sub-block of the plurality of sub-blocks that is disabled for BDOF during the BDOF gradient calculation from the first sub-block of the plurality of sub-blocks that is enabled for BDOF.

18. The apparatus of claim 11, wherein the processing circuitry is configured to:
determine the usage of the first DMVD process on the respective sub-block of the current block when the second DMVD process is disabled for the respective sub-block of the current block.

19. The apparatus of claim 11, wherein the processing circuitry is configured to:
   determine, when the second DMVD process is enabled, whether the second DMVD process is activated; and
   disable the first DMVD process when the second DMVD process is activated.

20. The apparatus of claim 11, wherein the processing circuitry is configured to:
   determine the usage of the first DMVD process when an early skip condition is true for the second DMVD process.

* * * * *